US011352518B2

(12) United States Patent
Sugihara et al.

(10) Patent No.: US 11,352,518 B2
(45) Date of Patent: Jun. 7, 2022

(54) PRETREATMENT LIQUID AND INK SET COMPRISING SAME

(71) Applicants: TOYO INK SC HOLDINGS CO., LTD., Tokyo (JP); TOYOCOLOR CO. LTD., Tokyo (JP)

(72) Inventors: Masahiro Sugihara, Tokyo (JP); Toshihiro Tetsuka, Tokyo (JP); Kazumasa Hattori, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 378 days.

(21) Appl. No.: 16/482,619

(22) PCT Filed: Nov. 20, 2017

(86) PCT No.: PCT/JP2017/041713
§ 371 (c)(1),
(2) Date: Jul. 31, 2019

(87) PCT Pub. No.: WO2018/142726
PCT Pub. Date: Aug. 9, 2018

(65) Prior Publication Data
US 2020/0010708 A1 Jan. 9, 2020

(30) Foreign Application Priority Data
Feb. 1, 2017 (JP) .............................. JP2017-017144

(51) Int. Cl.
| C09D 11/54 | (2014.01) |
| B41M 5/00 | (2006.01) |
| C09D 11/033 | (2014.01) |
| C09D 11/037 | (2014.01) |
| C09D 11/107 | (2014.01) |
| C09D 11/108 | (2014.01) |
| C09D 11/322 | (2014.01) |
| C09D 11/38 | (2014.01) |
| C09D 11/40 | (2014.01) |

(52) U.S. Cl.
CPC ........... *C09D 11/54* (2013.01); *B41M 5/0023* (2013.01); *C09D 11/033* (2013.01); *C09D 11/037* (2013.01); *C09D 11/107* (2013.01); *C09D 11/108* (2013.01); *C09D 11/322* (2013.01); *C09D 11/38* (2013.01); *C09D 11/40* (2013.01)

(58) Field of Classification Search
CPC ..... C09D 11/54; C09D 11/033; C09D 11/037; C09D 11/322; C09D 11/38; C09D 11/40; C09D 11/326; C09D 11/107; C09D 11/108; B41M 5/001; B41M 5/00; B41M 5/0023; B41J 2/01
USPC ........................................................ 523/160
See application file for complete search history.

(56) References Cited

U.S. PATENT DOCUMENTS

| 4,822,648 | A | 4/1989 | Cheng | |
| 6,605,337 | B1 | 8/2003 | Mori et al. | |
| 2006/0040061 | A1* | 2/2006 | Jensen Moller | ........ B32B 27/32 427/372.2 |
| 2009/0118418 | A1 | 5/2009 | Nakano et al. | |
| 2010/0233448 | A1 | 9/2010 | Kameyama et al. | |
| 2011/0001779 | A1 | 1/2011 | Kida | |
| 2014/0066550 | A1* | 3/2014 | Shigemori | ........... C09D 11/106 524/90 |
| 2014/0106140 | A1 | 4/2014 | Ikeda et al. | |
| 2015/0174920 | A1* | 6/2015 | Namba | .................. C09D 11/38 347/102 |
| 2015/0274992 | A1 | 10/2015 | Aoyama et al. | |
| 2015/0352836 | A1 | 12/2015 | Kanasugi et al. | |
| 2015/0352877 | A1 | 12/2015 | Niu et al. | |
| 2016/0312061 | A1 | 10/2016 | Aoai | |
| 2017/0088739 | A1 | 3/2017 | Yamashita et al. | |
| 2019/0390078 | A1* | 12/2019 | Moriyama | ............. C08G 18/12 |
| 2021/0130639 | A1* | 5/2021 | Sugihara | ................ B41M 5/502 |

FOREIGN PATENT DOCUMENTS

| CN | 1034965 A | 8/1989 |
| CN | 101049774 A | 10/2007 |
| CN | 101198664 A | 6/2008 |
| CN | 101831214 A | 9/2010 |

(Continued)

OTHER PUBLICATIONS

Catalog of "Brands and properties of CHEMIPEARL®", [Internet searched on Apr. 16, 2019],<URL: https://www.mitsuichem.com/sites/default/files/media/document/2018/p1712051500_pict_spec002.pdf> (total 1 page).
Office Action dated Jun. 20, 2017 issued in corresponding JP patent Application No. 2017-017144.
Office Action dated Aug. 22, 2017 issued in corresponding JP patent Application No. 2017-017144.

(Continued)

*Primary Examiner* — Hannah J Pak
(74) *Attorney, Agent, or Firm* — Sughrue Mion, PLLC

(57) ABSTRACT

Provided is a pretreatment liquid for aqueous pigment inkjet printing which excels in adhesion to non-permeable substrates such as film substrates and which can provide printed material having good printed image quality with little mixed color bleeding and color unevenness. Also provided is an ink set including the pretreatment liquid and an aqueous pigment inkjet ink. The pretreatment liquid for aqueous pigment inkjet ink printing comprises polyolefin resin particles (A), a flocculant (B), and water. The softening temperature of the polyolefin resin particles (A) is from 50 to 100° C., and the flocculant (B) contains at least one type of substance selected from metal salts and cationic polymer compounds.

6 Claims, No Drawings

(56) References Cited

FOREIGN PATENT DOCUMENTS

| CN | 103429435 A | 12/2013 |
|---|---|---|
| EP | 1 717 641 A2 | 11/2006 |
| JP | 2000-238422 A | 9/2000 |
| JP | 2000-335084 A | 12/2000 |
| JP | 2003-326829 A | 11/2003 |
| JP | 2005-74655 A | 3/2005 |
| JP | 2015-168796 A | 9/2015 |
| JP | 2015-186879 A | 10/2015 |
| JP | 2016-13688 A | 1/2016 |
| JP | 2016-168782 A | 9/2016 |
| JP | 2016-204524 A | 12/2016 |
| JP | 2017-61124 A | 3/2017 |
| JP | 2017-88646 A | 5/2017 |
| JP | 2017-222833 A | 12/2017 |
| WO | 2009/110263 A1 | 9/2009 |
| WO | 2014/116250 A1 | 7/2014 |
| WO | 2016/118161 A1 | 7/2016 |
| WO | 2016/187569 A1 | 11/2016 |

OTHER PUBLICATIONS

Office Action dated Nov. 14, 2017 issued in corresponding JP patent Application No. 2017-195338.
Office Action dated May 8, 2018 issued in corresponding JP patent Application No. 2017-195338.
Opposition dated Mar. 13, 2019 filed in corresponding JP patent Application No. 2017-195338 (issued as JP 6372674).
Office Action dated May 7, 2019 issued in corresponding JP patent Application No. 2017-195338 (issued as JP 6372674).
Notification of First Office Action dated Sep. 23, 2020 from the China National Intellectual Property Administration in the counterpart Chinese patent application No. 201780085421.0.
Extended European Search Report dated Jan. 23, 2020 from the European Patent Office in application No. 17895014.3.
Notification of reasons for Revocation dated Oct. 4, 2019 from the Japanese Patent Office in patent No. 6372674 (JP application No. 2017-195338).
"CHEMIPEARL® Polyolefin aqueous dispersion", [internet searched on Apr. 16, 2019], https://www.mitsuichem.com/jp/service/packaging/coatings/chemipearl/index.htm, (6 pages total).

* cited by examiner

PRETREATMENT LIQUID AND INK SET COMPRISING SAME

CROSS REFERENCE TO RELATED APPLICATIONS

This application is a National Stage of International Application No. PCT/JP2017/041713 filed Nov. 20, 2017, claiming priority based on Japanese Patent Application No. 2017-017144 filed Feb. 1, 2017.

TECHNICAL FIELD

The present invention relates to a pretreatment liquid, and an ink set including the pretreatment liquid.

BACKGROUND ART

Unlike the conventional plate-based printing such as offset printing, digital printing does not require a prepress film or platemaking, and therefore can facilitate cost reductions and an increase in printing speed. Thus, digital printing is expected to be prevalent in the future.

With an inkjet recording method, which is a type of digital printing, characters and images are obtained by directly ejecting and depositing ink droplets from an extremely fine nozzle onto a recording member. The inkjet recording method provides various advantages, including minimal noise from the devices used, good operability, and ease of coloration, and therefore the method is widely used in the output devices in offices and homes. With the improvements in the inkjet technologies, the use of the inkjet recording method in the digital printing output devices is now on the rise in the industrial applications as well.

Conventionally, the inks used in the inkjet recording methods for the industrial applications have been solvent-based inks or UV inks. In recent years, however, there has been an increasing demand for aqueous inks from the perspective of dealing with environmental concerns.

The conventional aqueous inks for inkjet recording methods (hereinafter, also simply referred to as "for inkjet applications") were designed specifically for standard paper and special purpose paper (for example, glossy photographic paper). Thus, the aqueous inks comprise water as a main component, and a water-soluble organic solvent such as glycerin and glycol is added to control the wettability and drying property with respect to the substrate. When a pattern of characters or images is printed onto the substrate using an aqueous ink for inkjet applications (hereinafter, also referred to as "aqueous inkjet ink" or simply "ink") comprising these liquid components, the liquid components will penetrate into the substrate and dry, and the fixation takes place.

Meanwhile, besides the above-mentioned standard paper, special purpose paper, and other high permeability substrates such as high quality paper and recycled paper, there are also various other substrates that can be used in the inkjet recording methods, including low permeability substrates such as coated paper, art paper, and lightly coated paper, and non-permeable substrates such as film substrates. To date, practically acceptable printed image quality has been achieved, using the aqueous inkjet inks as described above, on the high permeability substrates such as standard paper and special purpose paper and on the low permeability substrates such as coated paper and art paper. On the other hand, with regard to non-permeable substrates such as film substrates, the deposited ink droplets do not permeate into the substrate at all, and therefore the drying prompted by permeation does not occur, leading to the bleeding between the droplets and the impairment of the printed image quality. In addition, with non-permeable substrates, it is difficult to achieve sufficient adhesion of the ink due to the total lack of permeability for the ink, and the ink film would peel off during the post-processing etc. following the printing, making the practical application difficult.

Treatment of non-permeable substrates with a pretreatment liquid is known, as an approach to address the above problems. In general, two types of pretreatment liquids for aqueous inkjet inks are known. The first type of pretreatment liquid forms a layer (ink receiving layer) that absorbs the liquid components of the aqueous inkjet ink to improve the drying property (see Patent Documents 1 and 2). The second type of pretreatment liquid forms a layer (ink flocculation layer) that aggregates the solid components included in the aqueous inkjet ink such as colorants and resins, on purpose, to prevent bleeding or color unevenness between the droplets and improve image quality (see Patent Documents 3 and 4).

However, in the case of forming the ink receiving layer, when a large amount of ink is received at once, for example, cracking of the image which is attributed to the swelling of the ink receiving layer, bleeding or color unevenness caused by the excess amount of ink over the receivable limit, and a decrease in the concentration of the ink components due to the absorption into the receiving layer could occur. Furthermore, in the case of forming the receiving layer, the coating film thickness of the pretreatment liquid needs to be made thicker than for the ink flocculation layer described below. When the amount of coating is increased, the drying property of the pretreatment liquid itself may be deteriorated, and the potential problems such as poor drying become a concern. Also, as described above, when used with a non-permeable substrate such as a film substrate, the pretreatment liquid does not permeate the substrate at all, and therefore it is believed that the problems as described above become more likely.

On the other hand, as an example of a pretreatment liquid that uses an ink flocculation layer, Patent Document 3 describes a pretreatment liquid containing a polyvalent metal salt and (cationized) hydroxyethyl cellulose and having a prescribed surface tension. A high quality image, having a high image density, showing no bleeding, and excelling in scratch resistance, is said to be obtained by using this pretreatment liquid. However, in Patent Document 3, the pretreatment liquid is actually used only on a coated paper, which is a low permeability substrate, and it is not used on a non-permeable substrate such as a film. The present inventors evaluated its performance on polyolefin films and nylon films but the adhesion of the pretreatment liquid to these films was found to be insufficient.

Patent Document 4 also discloses a pretreatment liquid containing a colorant-flocculating agent and polyolefin particles, describing that the use of the pretreatment liquid can achieve a high image quality on a highly permeable substrate. However, as mentioned above, the pretreatment liquid described in Patent Document 4 is used for highly permeable substrates. The present inventors evaluated the pretreatment liquid on polyolefin films and nylon films and confirmed its poor adhesion to these films and image defects such as mixed color bleeding and color unevenness.

In general, it is known that adhesion of a pretreatment liquid to polyolefin films is improved by adding a certain amount of a polyolefin resin to the pretreatment liquid. It is also known that when a flocculant is added to a pretreatment liquid, the pretreatment liquid forms an ink flocculation layer and the image quality can be improved. However, in Patent Document 4, despite the use of a pretreatment liquid containing a polyolefin resin, its adhesion to polyolefin films was inferior. This result suggests that simple mixing of a polyolefin resin and a flocculant can result in a pretreatment liquid that is inferior in adhesion and image quality.

As described above, a pretreatment liquid for an aqueous pigment inkjet ink which excels in adhesion to a non-permeable substrate such as a film substrate, and which can provide excellent printed image quality showing little mixed color bleeding and color unevenness, has not existed in the past.

CITATION LIST

Patent Documents

Patent Document 1: JP 2000-238422 A
Patent Document 2: JP 2000-335084 A
Patent Document 3: JP 2005-074655 A
Patent Document 4: JP 2016-168782 A

SUMMARY OF INVENTION

Technical Problems

The present invention provides a pretreatment liquid for aqueous pigment inkjet printing which excels in adhesion to non-permeable substrates such as film substrates, and which can provide printed materials having good printed image quality and showing little mixed color bleeding and color unevenness. The present invention also provides an ink set including the pretreatment liquid and an aqueous inkjet ink.

Solution to Problems

An embodiment of the present invention provides a pretreatment liquid for aqueous pigment inkjet ink printing,
  the pretreatment liquid comprising: polyolefin resin particles (A), a flocculant (B), and water; wherein
  a softening temperature of the polyolefin resin particles (A) is from 50 to 100° C.; and
  the flocculant (B) contains at least one type of substance selected from metal salts and cationic polymer compounds.

Further, an embodiment of the present invention may be the pretreatment liquid as described above, wherein a 50% particle size (D50) of the polyolefin resin particles (A) is from 10 to 500 nm.

Further, an embodiment of the present invention may be the pretreatment liquid as described above, wherein the pretreatment liquid further comprises a protic organic solvent, wherein a weighted average of the boiling points of the protic organic solvent and the water is from 90 to 130° C.

Further, an embodiment of the present invention may be the pretreatment liquid as described above, wherein the surface tension is from 20 to 40 mN/m.

Further, an embodiment of the present invention may be the pretreatment liquid as described above, the pretreatment liquid being used for a film substrate.

Further, another embodiment of the present invention provides an ink set including: the pretreatment liquid; and an aqueous pigment inkjet ink comprising a pigment, a pigment-dispersing resin, a water-soluble organic solvent, and water, wherein an acid value of the pigment-dispersing resin is from 30 to 375 mgKOH/g.

Advantageous Effects of Invention

The present invention has enabled provision of a pretreatment liquid for aqueous pigment inkjet printing which excels in adhesion to non-permeable substrates such as film substrates, and which can provide printed materials having good printed image quality showing little mixed color bleeding and color unevenness, and an ink set including the pretreatment liquid and an aqueous inkjet ink.

DESCRIPTION OF EMBODIMENTS

The pretreatment liquid and ink set according to the embodiments of the present invention are described below by presenting the preferred embodiments. These embodiments are presented as examples and are not intended to limit the scope of the present invention.

A pretreatment liquid according to an embodiment of the present invention comprises: polyolefin resin particles (A), a flocculant (B), and water, wherein a softening temperature of the polyolefin resin particles (A) is from 50 to 100° C., and the flocculant (B) contains at least one type of substance selected from metal salts and cationic polymer compounds. The pretreatment liquid according to an embodiment of the present invention can achieve excellent adhesion to a non-permeable substrate such as a film substrate, and produce a printed material having a good printed image quality with little mixed color bleeding and color unevenness. The primary composition of a pretreatment liquid according to an embodiment of the present invention is described below.

A pretreatment liquid according to an embodiment of the present invention is applied onto a substrate, prior to the printing of an aqueous inkjet ink, and forms an ink flocculation layer on the substrate. The metal salts and some parts of the cationic polymer compounds included in the pretreatment liquid dissociate in the presence of water or a protic solvent, and these dissociated cations and the cationic groups in the cationic polymer compound become present at high concentrations in the ink flocculation layer. The cations and cationic groups induce an anion-cation interaction and an adsorption equilibrium transfer with the pigments which are anionically charged and present in a dispersed state in the aqueous inkjet ink. Thus, the pigments may be aggregated and precipitated, thereby suppressing the color mixing. The aqueous inkjet ink can also be printed prior to drying of the pretreatment liquid according to an embodiment of the present invention. In this case, the pigment can be aggregated and precipitated by the mixing of the aqueous inkjet ink and the pretreatment liquid which changes the dispersion equilibrium of the pigment.

However, the flocculant described above, by itself, has no adhesion to the film substrate, and thus would be unable to provide sufficient adhesion strength or coating film durability, easily peeling off when the printed material is rubbed with a finger, for example.

In general, a binder resin is used to realize desired adhesion strength and coating film durability. Furthermore, in order to impart adhesion to a polyolefin film for example, use of a polyolefin resin as a binder resin is believed to be suitable from the perspective of structural similarity. However, the present inventors have discovered that simple mixing of the two still results in insufficient adhesion strength, as well as insufficient effect of the flocculant. It is believed that this is because of the effect of the impermeability of the film substrate. That is, in the case of paper substrates, water or a water-soluble organic solvent permeates the substrate to some extent, and it is believed that this contributes to improved adhesion and drying property. However, when a film substrate is used, there is absolutely no contribution of permeation to adhesion and drying property. In addition, in the course of slow drying of the pretreatment liquid, the flocculant that has become insoluble may be aligned at the interface between the film substrate and the pretreatment liquid. Consequently, this is believed to lead to inhibition of adhesion and a decrease in the amount of flocculant available for the function of aggregating and precipitating the pigment.

Therefore, the present inventors conducted diligent research to achieve both excellent adhesion and printed image quality on a film substrate, and as a result discovered that the pretreatment liquid having the composition described above can achieve excellent adhesion to a non-permeable substrate such as a film substrate and can provide a printed material having excellent printed image quality and showing little mixed color bleeding and color unevenness.

The reason why both excellent adhesion and printed image quality on a film substrate can be achieved by the composition described above has not been specifically determined, but the following mechanisms can be envisaged. The metal salts and the cationic polymer compounds are highly capable of functioning as flocculants and are effective, even in small amounts, in aggregating and precipitating the pigment. On the other hand, since the flocculants have excellent solubility in water and protic organic solvents as well as excellent diffusion characteristics in these solvents, they are believed to be less likely to be aligned on the film substrate during the drying of the pretreatment liquid on the film substrate. It is also believed that the polyolefin resin particles (A) used in the pretreatment liquid according to an embodiment of the present invention have a suitable softening temperature and exhibit highly superior film formation characteristics. Therefore, when the pretreatment liquid is dried on the film substrate, it is believed that a polyolefin film can be formed at the interface with the film substrate before the flocculant becomes insoluble and aligned on the film substrate, thus realizing sufficient adhesion. Furthermore, it is believed that after the binder resin has formed a film on the film substrate, the flocculant having excellent diffusion characteristics is homogenized within the ink flocculation layer. Thus, a sufficient flocculation effect with respect to the aqueous inkjet ink may be achieved, and excellent printed image quality can be obtained.

As described above, in order to achieve both sufficient adhesion and printed image quality on a film substrate, the composition of the pretreatment liquid according to an embodiment of the present invention is preferably employed.

Next, the individual components constituting the pretreatment liquid and the ink set according to embodiments of the present invention will be described in detail below.

Polyolefin Resin Particles (A)

The pretreatment liquid according to an embodiment of the present invention contains polyolefin resin particles (A). As described above, the polyolefin resin particles (A) used in the pretreatment liquid according to an embodiment of the present invention have a suitable softening temperature and exhibit very excellent film formation characteristics.

Generally, a resin is present in a dissolved state (water-soluble resin), or in a dispersed state as resin particles (dispersible resin), in water or an aqueous medium such as a protic organic solvent. Of these, the resin particles, in comparison to the water-soluble resins, are characterized in that (i) high molecular weight resins can be used, (ii) higher amount can be included in the formulation, and (iii) once formed, the resin layer does not re-dissolve. Furthermore, the high molecular weight will facilitate the treatments such as modification treatment, oxidation, and halogenation treatment described below. For the above reasons, in the pretreatment liquid according to an embodiment of the present invention, the resin particles are preferably selected among the above-mentioned resin types.

In the pretreatment liquid according to an embodiment of the present invention, the polyolefin resin used as resin particles is a material that significantly contributes to the impartment of adhesion to a non-permeable substrate and has excellent film formation characteristics as described above.

Examples of resins that can be used as the polyolefin resin particles (A) in the pretreatment liquid according to an embodiment of the present invention include, but are not limited to, polyethylene resins, polypropylene resins, polybutylene resins, and polyolefin resins formed by copolymerizing two or more types selected from ethylene, propylene, and butylene. Further, in an embodiment of the present invention, the resin that can be used as the polyolefin resin particles (A) may be a paraffin resin such as n-paraffin and isoparaffin (with the proviso that the paraffin resin is solid at 25° C.).

Furthermore, in addition to untreated polyolefin resins, the polyolefin resin particles (A) may be, inter alia, modified polyolefin resins having an amino group, carboxyl group, hydroxyl group, acryloyl group, or other polymer chains introduced to the polyolefin chains; an oxidized polyolefin resin in which a portion of the polyolefin chain is oxidized; and a halogenated polyolefin resin in which a portion has been treated with halogen.

In an embodiment, the polyolefin resin particles (A) preferably comprise a polyolefin resin modified by a functional group containing an oxygen atom. A printed material with particularly excellent adhesion can be obtained by forming hydrogen bonds between the non-permeable substrate and the oxygen atoms in the polyolefin resin modified by a functional group containing an oxygen atom. Examples of the polyolefin resin modified by a functional group containing an oxygen atom include, but are not limited to, modified polyolefin resins having one or more functional groups selected from carboxyl groups, hydroxyl groups, and acryloyl groups introduced thereto, and oxidized polyolefin resins.

A single type of the polyolefin resin (A) described above may be used alone, or two or more types of polyolefin resin particles (A) may be used in combination.

From the perspective of ensuring sufficient adhesion and excellent printed image quality on the film substrate even in the presence of a flocculant, it is preferable to use polyolefin resin particles (A) having a softening temperature of from 50 to 100° C., more preferably from 60 to 90° C., and even more preferably from 65 to 85° C. With the softening temperature of not lower than 50° C., the coating film durability is sufficiently robust, and with the softening temperature of not higher than 100° C., the energy required for film formation is low, precluding the contraction or deformation of the film substrate, and therefore it is possible to obtain a printed material with favorable quality for practical use. The softening temperature can be measured by visual evaluation using a melting point measurement instrument. For example, using the "ATM-01" melting point measurement instrument from As One Corporation or the MP Series micro melting point measurement instrument from Yanaco KK, approximately 0.1 g of a sample of the polyolefin resin particles (A), which has been formed into a film in advance, is placed on the heat plate, and the temperature is raised gradually from room temperature. The temperature at which the sample has melted (finished melting) is taken as the softening temperature.

High precision measurement of the softening temperature is possible by adjustment of the temperature increase rate (specifically, the temperature increase rate is adjusted to 1° C./min when the temperature reaches 10° C. below the melting point), repeated measurements, and calibrations and corrections using commercially available reference samples for melting point measurements.

Further, the 50% particle size (D50) of the polyolefin resin particles (A) is preferably from 10 to 500 nm, more preferably from 30 to 400 nm, even more preferably from 50 to 300 nm, and yet even more preferably from 50 to 180 nm. With the particle size within the range described above, the fusion of the resin particles is facilitated, and particularly good film formation characteristics of the polyolefin resin particles (A) are achieved, and therefore particularly good adhesion onto the film substrate can be obtained. The 50% particle size of the resin particles described above can be measured by using a particle size distribution measurement device ("Microtrac UPA EX-150" available from Nikkiso Co., Ltd.), for example.

Furthermore, for the pretreatment liquid according to an embodiment of the present invention, it is also preferable to consider the minimum film-formation temperature (hereinafter, referred to as MFT) of the polyolefin resin particles (A). MFT refers to the minimum temperature required to fuse the resin microparticles together to form a film. When a pretreatment liquid comprising the resin particles is dried on a substrate, the particles will not fuse together and film formation defects will occur unless the substrate is heated to a temperature at or above the MFT. On the other hand, when the pretreatment liquid contains an organic solvent described below, the organic solvent may function as an agent that serves to reduce the MFT. When the MFT is reduced to the room temperature or below, the printing stability of the pretreatment liquid could be lowered. From this point of view, the MFT of the resin microparticles of the polyolefin resin particles (A) is preferably from 30 to 120° C., and more preferably from 40 to 110° C.

When the polyolefin resin particles (A) have an acid group, the acid value thereof is preferably from 1 to 200 mg KOH/g, and more preferably from 5 to 150 mg KOH/g. With the acid value of the polyolefin resin particles (A) within the range described above, the storage stability of the pretreatment liquid according to an embodiment of the present invention can be further improved. The acid value can be measured by potentiometric titration, using a known device such as "Automatic Potentiometric Titrator AT-610" available from Kyoto Electronics Manufacturing Co., Ltd.

The amount of the polyolefin resin particles (A) added in the pretreatment liquid according to an embodiment of the present invention is, in terms of solid, preferably from 0.1 to 25 wt %, more preferably from 1 to 20 wt %, and even more preferably from 5 to 15 wt % relative to the total amount of the pretreatment liquid. With the polyolefin resin particle (A) content within the range described above, excellent adhesion on the film substrate can be achieved.

The polyolefin resin particles (A) used in the pretreatment liquid according to an embodiment of the present invention can be synthesized by any known methods, or alternatively, commercially available products can be used. For the synthesis, the method described in JP 06-256529 A, for example, can be used. Examples of the commercially available products include, but are not limited to: Zaikthene AC, A, AC-HW-10, L, NC and N available from Sumitomo Seika Chemicals Co., Ltd.; Hardlen EH-801, EW-5303, EW-8511, NZ-1004, and NZ-1015 available from Toyobo Co., Ltd.; Auroren AE-301 and AE-502, and Superchlon E-415 and E-480T available from Nippon Paper Chemicals Co., Ltd.; AQUACER 497, 498, and 539 and HORDAMER PE02, PE03, PE34, and PE35 available from BYK Chemie GMBH; and Arrowbase SA-1200, SB-1200, SE-1200, and SB-1010 available from Unitika Ltd., and the like.

Flocculant (B)

The pretreatment liquid according to an embodiment of the present invention contains at least one type of substance selected from metal salts and cationic polymer compounds as the flocculant (B). As described above, the metal salts and the cationic polymer compounds are highly capable of functioning as flocculants, and also exhibit excellent solubility in water and protic organic solvents and excellent diffusion characteristics in these solvents, and as such present the materials that are suitably used for solving the problems of the present invention. It should be noted that, in the pretreatment liquid according to an embodiment of the present invention, either one of the metal salt or the cationic polymer compound may be selected for use, or a combination of both may be used.

In an embodiment, the flocculant (B) used in the pretreatment liquid according to the embodiment of the present invention is preferably low in hygroscopicity. When a flocculant with low hygroscopicity is used, the printed material exhibits little absorption of moisture in the air when stored in a high humidity environment or for a long period of time, and thus excellent adhesion and printed image quality can be maintained over an extended period of time.

In the present specification, a "flocculant with low hygroscopicity" refers specifically to a flocculant having a hydroscopic weight gain rate of not greater than 50%, wherein the hydroscopic weight gain rate is measured by the following method: First, the flocculant is stored in an environment having a temperature of 100° C. and a relative humidity of 75% RH or lower for 24 hours.

If the flocculant is available only in the form of an aqueous solution, as in the case of a commercially available product for example, water should be first removed through volatilization and then the flocculant is stored in the environment having a temperature of 100° C. and a relative humidity of 75% RH or lower for 24 hours. After the storage in the environment of a temperature of 100° C. and a relative humidity of 75% RH or lower, the weight of the flocculant is measured (designated as W1 (g)), and then it is further stored in an environment having a temperature of 40° C. and a relative humidity of 80% RH for 24 hours. After the storage in the environment of 40° C. and 80% RH, the weight of the flocculant is measured again (designated as W2 (g)), and the hygroscopic weight gain rate is calculated by Equation (1) below.

$$\text{Hygroscopic weight gain rate (\%)} = 100 \times [(W2-W1)/W1] \quad \text{Equation (1):}$$

From the perspective of obtaining the effect of maintaining excellent adhesion and print image quality, the hygroscopic weight gain rate of the flocculant (B) used in the pretreatment liquid according to the embodiment of the present invention is, as described above, preferably not greater than 50%, more preferably not greater than 35%, and even more preferably not greater than 20%.

Next, each of the flocculants will be described in detail below.

Cationic Polymer Compounds

When a cationic polymer compound is selected as the flocculant (B), any cationic polymer compound can be used as long as the compound reduces the dispersion ability of the pigments in the ink and exhibits suitable solubility, diffusion characteristics, or hygroscopic weight gain rate. Also, a single type may be used alone, or two or more types may be used in combination.

The solubility in 100 mL of water at 25° C. can be utilized as an indicator of the suitable solubility mentioned above. That is, a cationic polymer compound having a solubility in 100 mL of water at 25° C. of at least 5 g/100 mL $H_2O$ is preferably used in the pretreatment liquid according to an embodiment of the present invention.

The method for evaluating and determining the solubility of the cationic polymer compound will be described in detail below. A sample is prepared by thoroughly mixing 5 g of the cationic polymer compound and 100 mL of water. If the cationic polymer compound is available only in the form of an aqueous solution, as in the case for a commercially available product for example, water should be added, or removed by volatilization, so that the solid content becomes 5 g per 100 mL of water to provide the sample. Subsequently, the sample is left at 25° C. for 24 hours, and the solubility of the cationic polymer compound in 100 mL of water at 25° C. is determined to be 5 g/100 mL $H_2O$ or greater if a 50% particle size is unable to be measured. The 50% particle size is measured in the same manner as for the polyolefin resin particles (A).

Examples of cationic groups that may be comprised in the cationic polymer compound include, but are not limited to, amino groups, ammonium groups, amide groups, and —$NHCONH_2$. Examples of the material that may be used to introduce the cationic group to form the cationic polymer compound include, but are not limited to: amine compounds such as vinyl amine, allylamine, methyl diarylamine, and ethyleneimine; amide compounds such as acrylamide, vinylformamide, and vinylacetamide; cyanamide compounds such as dicyandiamide; epihalohydrin compounds such as epifluorohydrin, epichlorohydrin, methyl epichlorohydrin, epibromohydrin, and epiiodohydrin; cyclic vinyl compounds such as vinylpyrrolidone, vinylcaprolactam, and vinylimidazole; amidine compounds; pyridinium salt compounds; and imidazolium salt compounds.

When a cationic polymer compound is used as the flocculant (B) in the pretreatment liquid according to an embodiment of the present invention, the cationic polymer compound preferably contains one or more types of structural units selected from a diallylamine structural unit, a diallylammonium structural unit, and an epihalohydrin structural unit, and more preferably contains at least a diallylammonium structural unit. All of the resins described above are strong electrolytes, have good dissolution stability in the pretreatment liquid, and are highly capable of reducing the dispersion of the pigment in the ink.

Among the above, the resin containing a diallylammonium structural unit is preferable because it can exhibit particularly excellent aggregation performance and provide a printed material showing little mixed color bleeding and little color unevenness and excellent color development on a film substrate. For the diallylammonium structural unit, a hydrochloride salt or ethyl sulfate salt of diallyl dimethyl ammonium or diallyl methyl ethyl ammonium can be selected favorably with respect to easy availability etc.

Although the reason is not clear, a printed material that uses a resin containing an epihalohydrin structural unit excels in water resistance, and therefore can be suitably selected from this viewpoint as well. Examples of the resin containing an epihalohydrin structural unit include, but are not limited to, epihalohydrin-modified polyamine resins, epihalohydrin-modified polyamide resins, epihalohydrin-modified polyamide-polyamine resins, and epihalohydrin-amine copolymers. For the epihalohydrin, epichlorohydrin or methylepichlorohydrin may be selected favorably with respect to easy availability etc.

The cationic polymer compounds described above may be synthesized by any known synthesis methods, or alternatively, commercially available products may be used. Specific examples of commercially available products containing a diallylamine structural unit include: PAS-21 CL, PAS-21, PAS-M-1L, PAS-M-1, PAS-M-1A, PAS-92, and PAS-92A (available from Nittobo Medical Co., Ltd.); and Unisence KCA100L and KCA101L (available from Senka Corporation). Examples of commercially available products of resin containing a diallylammonium structural unit include: PAS-H-1L, PAS-H-SL, PAS-H-10L, PAS-24, PAS-J-81L, PAS-J-81, and PAS-J-41 (available from Nittobo Medical Co., Ltd.); and Unisence FPA100L, FPA101L, FPA102L, FPA1000L, FPA1001L, FPA1002L, FCA1000L, FCA1001L, and FCA5000L (available from Senka Corporation). Furthermore, commercially available products of resins that contain both a diallylamine structural unit and a diallylammonium structural unit include PAS-880 (available from Nittobo Medical Co., Ltd.).

Specific examples of commercially available products containing an epihalohydrin structural unit include: FL-14 (available from SNF), Arafix 100, 251S, 255, and 255LOX (available from Arakawa Chemical Industries, Ltd.); DK-6810, 6853, and 6885; WS-4010, 4011, 4020, 4024, 4027, and 4030 (available from Seiko PMC Corporation), Papyogene P-105 (available from Senka Corporation); Sumirez Resin 650 (30), 675A, 6615, and SLX-1 (available from Taoka Chemical Co., Ltd.), Catiomaster PD-1, 7, 30, A, PDT-2, PE-10, PE-30, DT-EH, EPA-SK01, and TMHMDA-E (available from Yokkaichi Chemical Co., Ltd.), and Jetfix 36N, 38A, and 5052 (available from Satoda Chemical Industrial Co., Ltd.).

When a cationic polymer compound is used as the flocculant (B) in the pretreatment liquid according to an embodiment of the present invention, the amount comprised is, in terms of solid, preferably from 1 to 30 wt %, more preferably from 3 to 20 wt %, and particularly preferably from 5 to 15 wt % relative to the total amount of the pretreatment liquid. With the cationic polymer compound content within the range described above, the viscosity of the pretreatment liquid can be kept within a suitable range, and a pretreatment liquid showing excellent storage stability upon a long term storage can be obtained.

Metal Salts

When a metal salt is selected as the flocculant (B), any metal salt material can be used as long as, similarly to the case of the cationic polymer compound, the metal salt reduces the dispersion ability of the pigments in the ink and exhibits suitable solubility and diffusion characteristics. Also, a single type may be used alone, or two or more types may be used in combination.

In the pretreatment liquid according to an embodiment of the present invention, the solubility of the suitably used metal salt is, per 100 mL of water at 25° C., preferably from 5 to 55 g/100 mL $H_2O$, more preferably from 10 to 45 g/100 mL $H_2O$, and particularly preferably from 15 to 40 g/100 mL H₂O. When the solubility is within the range described above, the polyolefin resin particles (A) do not become insoluble before the film formation, and therefore a pretreatment liquid that can achieve both the adhesion and the printed image quality can be obtained. In addition, the metal salt does not absorb the moisture in the air and therefore the metal salt does not cause a decrease in the adhesion or poor drying on a film substrate, and it also precludes mixed color bleeding and color unevenness of the ink droplet dots caused by absorbed moisture.

In the case of a metal salt, the method for evaluating solubility involves adding the metal salt gradually into a container containing 100 mL of water at 25° C. under stirring. The maximum amount of metal salt that can be added to the solution without any metal salt remaining at the bottom of the container is defined as the solubility of the metal salt.

In the pretreatment liquid according to an embodiment of the present invention, the type of metal salt is not particularly limited as long as it is composed of a metal ion and an anion boding to the metal ion. Among these metal salts, the metal salt comprising a polyvalent metal salt is preferable from the perspective of obtaining a sharp image while suppressing mixed color bleeding and eliminating color unevenness by interacting instantaneously with the pigment. From the perspective of facilitating interaction not only with the pigments but also with the solid components such as the resin, the metal salt more preferably contains, as polyvalent metal ions, at least one type selected from $Ca^{2+}$, $Mg^{2+}$, $Zn^{2+}$, $Al^{3+}$, $Fe^{2+}$, and $Fe^{3+}$. Further, among these, a polyvalent metal ion selected from $Ca^{2+}$, $Mg^{2+}$, $Zn^{2+}$, $Al^{3+}$ is especially preferable because they have strong ionization tendency and readily provide cations, and therefore have an advantage of producing a more significant aggregation effect. Further, $Ca^{2+}$ ion is extremely preferable because it has a small ionic radius and can migrate more readily within the ink flocculation layer and the ink droplets.

Specific examples of the inorganic metal salts include, but are not limited to, calcium chloride, magnesium chloride, aluminum chloride, calcium bromide, magnesium bromide, calcium nitrate, magnesium nitrate, magnesium sulfate, aluminum sulfate, calcium carbonate, and magnesium carbonate. Specific examples of the organic metal salts include, but are not limited to, calcium salts, magnesium salts, nickel salts, zinc salts, and the like of organic acids such as pantothenic acid, propionic acid, ascorbic acid, acetic acid, and lactic acid. Among these metal salts of organic acids, calcium salts of lactic acid and acetic acid are more preferred from the perspective of solubility in water and interaction with the components of the ink.

The metal salt content of the pretreatment liquid according to an embodiment of the present invention is, in terms of metal ions relative to the total amount of the pretreatment liquid, preferably from 0.5 to 8 wt %, more preferably from 1 to 6.5 wt %, and particularly preferably from 1.5 to 5 wt %. With the metal ion content within the range described above, wettability of the pretreatment liquid to the substrate can be ensured while suppressing mixed color bleeding and color unevenness. In addition, such a range is also preferable because a suitable drying property can be achieved without an excessive increase in the boiling point attributed to the metal salt. The metal ion content with respect to the total weight of the pretreatment liquid can be determined by Equation (2) below.

$$\text{(Metal Ion Content)}(wt\ \%) = WC \times MM \div MC \quad \text{Equation (2):}$$

In General Equation (2), WC represents the metal salt content relative to the total weight of the pretreatment liquid, MM represents the molecular weight of the metal ion constituting the metal salt, and MC represents the molecular weight of the metal salt.

Protic Organic Solvent

The pretreatment liquid according to an embodiment of the present invention preferably further uses a protic organic solvent in order to sufficiently dissolve the flocculant described above, to prevent the polyolefin resin particles (A) from becoming insoluble before it forms a film, and to uniformly coat the pretreatment liquid onto the film substrate. The protic organic solvent that can be suitably used in the pretreatment liquid according to an embodiment of the present invention can be any water-soluble organic solvent as long as it is protic, but preferable examples include, inter alia, alcohol-based water-soluble organic solvents and nitrogen-containing water-soluble organic solvents.

As described above, when the pretreatment liquid is applied to a non-permeable substrate such as a film substrate, the substrate itself does not have permeability at all, and therefore the solvent in the pretreatment liquid will more readily persist than with a permeable substrate such as a paper substrate. In particular, when a water-soluble organic solvent having a high boiling point is used in the pretreatment liquid, the water-soluble organic solvent can persist for an extended period of time, which can lead to lowering of printed image quality and adhesion and also impairment of coating film durability.

As described above, when a protic organic solvent is used in the pretreatment liquid according to an embodiment of the present invention, its boiling point is preferably within a certain range that is suitable with respect to drying property on the film substrate, the printed image quality, adhesion, and coating film durability. That is, the weighted average of the boiling points of the water and the protic organic solvent(s) comprised in the pretreatment liquid is preferably from 90 to 140° C., more preferably from 90 to 130° C., even more preferably from 90 to 120° C., and particularly preferably from 90 to 110° C. The weighted average of the boiling points is determined by Equation (3) below.

$$\text{(Boiling Point Weighted Average)}(°\ C.) = \Sigma(BS \times WS \div 100) \quad \text{Equation (3):}$$

In General Equation (3), BS represents the boiling point (° C.) of each protic organic solvent and water at 1 atm, and WS represents the proportion of each protic organic solvent and the water with respect to the total amount of the protic organic solvents and the water.

Furthermore, since the characteristics described above may vary depending on the protic organic solvent that remains after the water has volatilized and dried, it is preferable to adjust the boiling point of the protic organic solvent comprised in the pretreatment liquid. That is, the weighted average of the boiling point(s) of the protic organic solvent(s) comprised in the pretreatment liquid is preferably from 70 to 300° C., more preferably from 70 to 250° C., even more preferably from 70 to 200° C., yet even more preferably from 75 to 190° C., yet even more preferably from 80 to 180° C., and particularly preferably from 80 to 160° C. The weighted average of the boiling points described above is also determined by Equation (3) shown above, but in this case, BS in Equation (3) represents the boiling point (° C.) at 1 atm of each of the protic organic solvents, and WS represents the proportion of each of the protic organic solvents relative to the total amount of the protic organic solvents.

Furthermore, when the pretreatment liquid according to an embodiment of the present invention contains two or more types of protic organic solvents, the boiling point at 1 atm of each protic organic solvent is preferably from 80 to 200° C., more preferably from 80 to 190° C., and even more preferably from 80 to 180° C. A boiling point of from 80 to 170° C. is particularly preferable. With the boiling point of each of the protic organic solvents within the range described above, the protic organic solvents can dry rapidly and be prevented from persisting during the process of drying the pretreatment liquid applied onto the film substrate, thus a printed material having excellent printed image quality and adhesion can be obtained.

Examples of specific compounds that can be suitably used as alcohol-based water-soluble organic solvents in the pretreatment liquid according to an embodiment of the present invention include, but are not limited to: monohydric alcohols such as methanol, ethanol, 1-propanol, 2-propanol, 1-butanol, 2-butanol, 3-methoxy-1-butanol, and 3-methoxy-3-methyl-1-butanol;

dihydric alcohols (glycols) such as 1,2-ethanediol, 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-L5-pentanediol, 2-methyl-2-propyl-1,3-propanediol, 2-methylpentane-2,4-diol, 2-ethyl-1,3-hexanediol, 1,2-octanediol, ethylene glycol, diethylene glycol, triethylene glycol, dipropylene glycol, butylene glycol, and dibutylene glycol;

trihydric alcohols such as glycerin;

and glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, tripropylene glycol monomethyl ether, and tripropylene glycol monoethyl ether. Specific examples of nitrogen-containing water-soluble organic solvents include, but are not limited to, 2-pyrrolidone, N-methylpyrrolidone, N-ethylpyrrolidone, 3-methyl-2-oxazolidinone, and 3-ethyl-2-oxazolidinone.

In the present embodiment, among the protic organic solvents listed above, 1-propanol, 2-propanol, 1-butanol, 2-butanol, 3-methoxy-1-butanol, 1,2-ethanediol, and 1,2-propanediol (propylene glycol) are preferably selected, and of these, 2-propanol and 3-methoxy-1-butanol are particularly preferably selected, due to the fact that they have suitable boiling points, and they also have suitable surface tension and therefore allow uniform application onto a non-permeable substrate for the betterment of printed image quality of the printed material.

When the pretreatment liquid according to an embodiment of the present invention contains a protic organic solvent, the amount thereof with respect to the total amount of the pretreatment liquid is preferably from 0.1 to 20 wt %, and more preferably from 0.5 to 15 wt %, from the perspective of achieving suitable solubility of the flocculant and ensuring excellent printed image quality on the film substrate. The amount thereof is particularly preferably from 1 to 10 wt %.

Surfactant

The pretreatment liquid according to an embodiment of the present invention can use a surfactant to facilitate uniform application onto a film substrate. Examples of surfactants generally include silicone-based (siloxane-based), acrylic-based, fluorine-based and acetylene diol-based surfactants. In a preferred embodiment, from the perspective of controlling the surface tension of the pretreatment liquid and imparting excellent wettability on the film substrate, use of an acetylene diol-based surfactant or a silicone-based (siloxane-based) surfactant is preferable, and an acetylene diol-based surfactant is particularly preferable.

From the perspective of uniformly applying the pretreatment liquid while reducing coating unevenness on the film substrate, the amount of the surfactant used in the pretreatment liquid according to an embodiment of the present invention is preferably from 0.01 to 10 wt %, and more preferably from 0.05 to 5 wt %, relative to the total amount of the pretreatment liquid. The amount thereof is particularly preferably from 0.1 to 3 wt %.

In addition, the surface tension of the pretreatment liquid according to an embodiment of the present invention is preferably from 20 to 45 mN/m, and more preferably from 20 to 40 mN/m from the perspective of providing sufficient wettability on the film substrate and achieving uniform application. The surface tension thereof is particularly preferably from 20 to 30 mN/m.

Also, in another embodiment of the present invention, the surface tension of the pretreatment liquid is preferably from 30 to 40 mN/m, and more preferably from 30 to 35 mN/m from the perspective of obtaining a printed material with excellent printed image quality without mixed color bleeding, color unevenness, or voids (insufficient filling of the solid parts in the printed image) on the film substrate.

Surface tension in the present embodiment refers to the surface tension measured by the Wilhelmy method (plate method, vertical plate method) in an environment at 25° C., and it can be measured by using, for example, a surface tensiometer CBVP-Z available from Kyowa Interface Science, Inc.

The surfactant used in the pretreatment liquid according to an embodiment of the present invention can be synthesized by any known methods, or alternatively, commercially available products can be used. In the latter case, examples of siloxane-based surfactants that can be selected from commercially available products include BY16-201, FZ-77, FZ-2104, FZ-2110, FZ-2162, F-2123, L-7001, L-7002, SF8427, SF8428, SH3749, SH8400, 8032ADDITIVE, and SH3773M (available from Dow Corning Toray Co., Ltd.), Tegoglide 410, Tegoglide 432, Tegoglide 435, Tegoglide 440, Tegoglide 450, Tegotwin 4000, Tegotwin 4100, Tegowet 250, Tegowet260, Tegowet270, and Tegowet 280 (available from Evonik Degussa Corporation), SAG-002 and SAG-503A (available from Nissin Chemical Industry Co., Ltd.), BYK-331, BYK-333, BYK-345, BYK-346, BYK-347, BYK-348, BYK-349, BYK-UV3500, and BYK-UV3510 (available from BYK Chemie GMBH), and KF-351A, KF-352A, KF-353, KF-354L, KF355A, KF-615A, KF-640, KF-642, and KF-643 (available from Shin-Etsu Chemical Co., Ltd.).

In addition, examples of acetylene-based surfactants include, but are not limited to, Surfynol 61, 104E, 104H, 104A, 104BC, 104DPM, 104PA, 104PG-50, 420, 440, 465, 485, SE, and SE-F, and Dynol 604 and 607 (available from Air Products and Chemicals, Inc.), and Olfine E1004, E1010, E1020, PD-001, PD-002W, PD-004, PD-005, EXP. 4001, EXP. 4200, EXP. 4123, and EXP. 4300 (available from Nissin Chemical Industry Co., Ltd.). The above surfactants may be each used alone or two or more types may be used in combination.

Water

The pretreatment liquid according to an embodiment of the present invention contains water as an essential component. In water, the flocculant exhibits good solubility, and also exhibits good diffusion characteristics. Therefore, water is a suitable material for solving the problem addressed by the present invention, i.e. to achieve both adhesion and printed image quality. In order to favorably express the characteristics described above, the amount of water comprised in the pretreatment liquid according to an embodiment of the present invention is preferably in a range from 30 to 95 wt. %, more preferably from 40 to 90 wt. %, and even more preferably from 50 to 85 wt. %, relative to the total amount of the pretreatment liquid.

Other Materials

A pH adjusting agent can be added to the pretreatment liquid according to an embodiment of the present invention for the purpose of suppressing damage to the members used in the coating device, maximizing the bleeding suppression effect of the ink flocculation layer, and suppressing pH fluctuations over time to maintain the performance of the pretreatment liquid for a long period of time. In the present embodiment, any material having a pH adjustment capability can be optionally selected. Examples of materials for basification include, but are not limited to: alkanolamines such as dimethylethanolamine, diethanolamine, triethanolamine, and N-methyldiethanolamine; liquid ammonia; hydroxides of alkali metals such as lithium hydroxide, sodium hydroxide, and potassium hydroxide; and carbonates of alkali metals such as lithium carbonate, sodium carbonate, sodium hydrogen carbonate, and potassium carbonate. Also, examples of materials for acidification include, but are not limited to, hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid, and glutamic acid. The above pH adjusting agents may be each used alone or two or more types may be used in combination.

The amount of the pH adjusting agent is preferably from 0.01 to 5 wt %, and more preferably from 0.1 to 4.5 wt %, relative to the total amount of the pretreatment liquid. If the amount of the pH adjusting agent added is too small, pH changes may be immediately caused by external stimuli such as the dissolution of carbon dioxide, and if the pH adjusting agent is included in excess, the function of the metal salt in the pretreatment liquid could be inhibited, and therefore it is preferable that the amount of the pH adjusting agent is within the range described above.

Other Components

Furthermore, in order to achieve desired physical property values, additives such as an anti-foaming agent and a preservative can be added as appropriate, depending on the needs, to the pretreatment liquid according to an embodiment of the present invention. When these additives are used, the amount thereof with respect to the total amount of the pretreatment liquid is preferably from 0.01 wt % to 10 wt %, and more preferably from 0.01 wt % to 5 wt %. If the additives are added in excess the function of the flocculant in the pretreatment liquid may be inhibited, and therefore the amount added is preferably within the above-described range.

Method for Producing Pretreatment Liquid

The pretreatment liquid according to an embodiment of the present invention comprising the components described above may be produced, for example, by adding polyolefin resin particles (A), a flocculant (B), and, as necessary, a protic organic solvent, a surfactant, a pH adjusting agent, and additive components appropriately selected as described above, stirring and mixing, and then filtering as necessary. However, the method for producing the pretreatment liquid is not limited to the above method.

Ink Set

The pretreatment liquid according to an embodiment of the present invention can be combined with, for example, a solvent inkjet ink, a UV inkjet ink, or an aqueous inkjet ink, to be used in the form of an ink set. In particular, since water is the common main solvent, the pretreatment liquid is preferably combined with an aqueous inkjet ink to be used in the form of an ink set. The components of the aqueous inkjet ink constituting the ink set according to an embodiment of the present invention (hereinafter, also referred to simply as "aqueous inkjet ink according to an embodiment of the present invention") are described below.

Pigment

The aqueous inkjet ink according to an embodiment of the present invention preferably comprises a pigment as a colorant, from the perspective of water resistance, light resistance, weather resistance, gas resistance, etc., and also from the perspectives of fast aggregation speed and the ability to obtain high quality images in comparison to dyes when the pretreatment liquid is used in high speed printing. Any known organic pigment or inorganic pigment can be used as the pigment mentioned above. The amount of these pigments relative to the total amount of the ink is preferably in a range from 2 wt % to 15 wt %, more preferably in a range from 2.5 wt % to 15 wt %, and particularly preferably in a range from 3 wt % to 10 wt %. With the pigment content of not less than 2 wt %, sufficient color development can be obtained even in one-pass printing. With the pigment content of not greater than 15 wt %, the viscosity of the ink can be kept within a range suitable for inkjet printing, and the long term stability of the ink can also be maintained in a favorable state, and as a result, long term printing stability can be ensured.

Examples of cyan organic pigments that can be used in aqueous inkjet inks according to an embodiment of the present invention include, but are not limited to, C. I. Pigment Blue 1, 2, 3, 15:3, 15:4, 15:6, 16, 22, 60, 64, and 66. Among these, one or more types of cyan organic pigments selected from C. I. Pigment Blue 15:3 and 15:4 are preferable due to the excellent color development and light fastness.

Further, examples of magenta organic pigments that can be used include, but are not limited to, C. I. Pigment Red 5, 7, 12, 22, 23, 31, 48 (Ca), 48 (Mn), 49, 52, 53, 57 (Ca), 57:1, 112, 122, 146, 147, 150, 185, 238, 242, 254, 255, 266, and 269, and C. I. Pigment Violet 19, 23, 29, 30, 37, 40, 43, and 50. Among these, one or more types of magenta organic pigments selected from the group consisting of C. I. Pigment Red 122, 150, 185, 266, 269 and C. I. Pigment Violet 19 are preferable due to the excellent color development and light fastness.

Further, examples of yellow organic pigments that can be used include, but are not limited to, C. I. Pigment Yellow 10, 11, 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, and 213. Among these, one or more types of yellow organic pigments selected from the group consisting of C. I. Pigment Yellow 13, 14, 74, 120, 180, 185, and 213 are preferable due to the excellent color development.

Examples of black organic pigments include, but are not limited to, aniline black, Lumogen black, and azo-azomethine black. It is noted that a plurality of chromatic pigments such as the cyan pigments, magenta pigments, and yellow pigments described above and the orange pigments, green pigments, and brown pigments described below may be used together to form a black pigment.

The spot colors such as those of orange pigments, green pigments, and brown pigments can also be utilized in the aqueous inkjet ink according to an embodiment of the present invention. Specific examples include, but are not limited to, C. I. Pigment Orange 16, 36, 43, 51, 55, 59, 61, 64, and 71, C. I. Pigment Green 7, 36, 43, and 58, and Pigment Brown 23, 25, and 26.

The inorganic pigments that can be used in the aqueous inkjet ink according to an embodiment of the present invention are not particularly limited, and examples include carbon black and iron oxide as black pigments and titanium oxide as a white pigment.

Examples of carbon black that can be used in aqueous inkjet inks according to an embodiment of the present invention include, but are not limited to, carbon blacks produced by a furnace process and a channel process. Among these carbon blacks, those having such characteristics as a primary particle size of from 11 to 50 nm, a specific surface area of from 50 to 400 $m^2/g$ according to the BET method, a volatile content of from 0.5 to 10 wt. %, and a pH of from 2 to 10 are preferable. Commercially available products having such characteristics include, for example, No. 25, 30, 33, 40, 44, 45, 52, 850, 900, 950, 960, 970, 980, 1000, 2200B, 2300, 2350, and 2600; MA7, MA8, MA77, MA100, and MA230 (available from Mitsubishi Chemical Corporation), RAVEN 760UP, 780UP, 860UP, 900P, 1000P, 1060UP, 1080UP, and 1255 (available from Columbia Carbon Company), REGAL 330R, 400R, 660R, and MOGUL L (available from Cabot Corporation), NIPex 160 IQ, 170 IQ, 35, and 75; PrinteX 30, 35, 40, 45, 55, 75, 80, 85, 90, 95, and 300; Special Black 350, 550; and Nerox 305, 500, 505, 600, and 605 (available from Orion Engineered Carbons), and any of these can be preferably used.

Either an anatase type or a rutile type titanium oxide can be suitably used as a white pigment, but the use of a rutile type is preferable in order to increase the covering power on the printed material. Further, the titanium oxide may be produced by any methods such as the chloride process and the sulfate process, but the use of titanium oxide produced by the chloride process is preferable due to the high degree of whiteness.

The surface of the titanium oxide pigment that can be used in the aqueous inkjet ink according to an embodiment of the present invention is preferably treated with an inorganic compound and/or organic compound. Examples of the inorganic compound include the compounds of silicon (Si), aluminum, zirconium, tin, antimony, and titanium, and hydrated oxides thereof. Examples of the organic compound include polyhydric alcohols, alkanolamines or derivatives thereof, higher fatty acids or metal salts thereof, and organometallic compounds, and among these, polyhydric alcohols or derivatives thereof can modify the titanium oxide surface to become highly hydrophobic and improve the dispersion stability, and thus are preferably used.

In an aqueous inkjet ink according to an embodiment of the present invention, a plurality of the pigments described above can be used as a mixture in order to keep the color hue and the color development of the printed material within a suitable range. For example, in order to improve the color tone at a low coverage rate, a small amount of one or more pigments selected from cyan organic pigments, magenta organic pigments, orange organic pigments, and brown organic pigments can be added to black ink that uses a carbon black pigment.

Pigment-Dispersing Resin

Examples of the methods for stably maintaining in a dispersed state the pigments described above in an aqueous inkjet ink include: a method of allowing the pigment surface to adsorb a pigment dispersing resin to provide dispersion; a method of allowing the pigment surface to adsorb a water-soluble and/or water-dispersible surfactant to provide dispersion; a method of chemically or physically introducing hydrophilic functional groups onto the pigment surface to disperse the pigment in the ink without using a dispersing agent or surfactant; and a method of coating the pigment with a self-dispersible resin to make a microcapsule.

Among these, the method that uses a pigment-dispersing resin is preferably selected for the aqueous inkjet ink according to an embodiment of the present invention. This is because the adsorbability of the pigment-dispersing resin with respect to the pigment and the electric charge of the pigment-dispersing resin can be easily adjusted by selecting/considering different monomer compositions and different molecular weights of the pigment-dispersing resin, and as a result, dispersion stability can be imparted to the fine pigments, and the ability of the pretreatment liquid to reduce the dispersibility of the pigment can be controlled.

The type of the pigment-dispersing resin is not particularly limited, and examples thereof include, but are not limited to, acrylic resins, styrene acrylic resins, maleic acid resins, styrene maleic acid resins, urethane resins, and ester resins. Among these, use of an acrylic resin or styrene acrylic resin is particularly preferable in terms of wide selectability of the raw materials and ease of synthesis. The pigment-dispersing resins above can be synthesized by any known methods, or alternatively, commercially available products can be used.

In an aqueous inkjet ink according to an embodiment of the present invention, the acid value of the pigment-dispersing resin is preferably from 30 to 390 mg KOH/g, and more preferably from 30 to 375 mg KOH/g. With the acid value kept within the range described above, the level of dispersion of the pigment can be quickly lowered by the pretreatment liquid, allowing the pigment to aggregate and deposit on the substrate. Such an acid value is also preferable because the solubility of the pigment-dispersing resin in water can be thereby ensured, and suitable interactions between the pigment-dispersing resins can be thereby obtained to suppress the viscosity of the pigment dispersion. From the perspectives of drawing good aggregating performance from the pretreatment liquid and obtaining excellent printed image quality with little color unevenness or mixed color bleeding, the acid value of the pigment-dispersing resin is preferably from 60 to 350 mg KOH/g, and more preferably from 80 to 325 mg KOH/g. The acid value is more preferably from 100 to 300 mgKOH/g. The acid value of the pigment-dispersing resin can be measured in the same manner as for the acid value of the polyolefin resin particles (A).

In an aqueous inkjet ink according to an embodiment of the present invention, an alkyl group having from 10 to 36 carbons is preferably introduced into the pigment-dispersing resin. This is because the introduction of the alkyl group having from 10 to 36 carbons can achieve reduction in the viscosity of the pigment dispersion, and further stabilization of the dispersion and its viscosity. The number of carbons in the alkyl group is more preferably from 12 to 30, and even more preferably from 18 to 24. As long as the number of carbons in the alkyl group is in a range from 10 to 36, either linear or branched chain alkyl groups can be used, but a linear alkyl group is preferable. Examples of linear alkyl groups include a lauryl group (C12), myristyl group (C14), cetyl group (C16), stearyl group (C18), arachyl group (C20), behenyl group (C22), lignoceryl group (C24), cerotoyl group (C26), montanyl group (C28), melissyl group (C30), dotriacontanoyl group (C32), tetratriacontanoyl group (C34), and hexatriacontanoyl group (C36).

The amount of the monomer containing the alkyl chain having from 10 to 36 carbons, comprised in the pigment-dispersing resin, is preferably from 5 wt % to 60 wt %, more preferably from 10 wt % to 55 wt %, and particularly preferably from 20 wt % to 50 wt % from the perspective of achieving both low viscosity of the pigment dispersion and scratch resistance and glossiness of the printed material.

Also, introduction of an aromatic group into the pigment-dispersing resin is particularly preferable, from the viewpoint of improving the adsorbability with respect to the pigments while permitting quick lowering of the pigment dispersibility upon the mixing with the pretreatment liquid. This is because a strong intermolecular force called cation-π interaction occurs between the cationic component of the metal salt comprised in the pretreatment liquid and the pigment-dispersing resin having the aromatic group upon mixing the pretreatment liquid and the aqueous inkjet ink, resulting in preferential adsorption between the two. Examples of the aromatic groups include, but are not limited to, a phenyl group, naphthyl group, anthryl group, tolyl group, xylyl group, mesityl group, and anisyl group. Among these, the phenyl group and tolyl group are preferable as the aromatic group from the perspective of ensuring sufficient dispersion stability.

From the perspective of achieving both dispersion stability of the pigment and adsorption performance with the pretreatment liquid, the amount of the monomer containing the aromatic ring is preferably from 5 to 70 wt %, more preferably from 5 to 65 wt %, and even more preferably from 10 to 50 wt %, with respect to total amount of the pigment-dispersing resin.

Acid groups in the pigment-dispersing resin are preferably neutralized with a base in order to increase the solubility in the ink. However, the amount of the base added should be carefully watched, because if the base is added in excess, the cationic components comprised in the pretreatment liquid may be neutralized and may be prohibited from exhibiting a sufficient effect. Whether the amount of the base to be added is excessive or not can be verified by, for example, preparing a 10 wt % aqueous solution of the pigment-dispersing resin and measuring the pH of the aqueous solution. In order to allow sufficient functioning of the pretreatment liquid, pH of the aqueous solution should be preferably from 7 to 11, and more preferably from 7.5 to 10.5.

Examples of the bases that can be used to neutralize the pigment-dispersing resin include, but are not limited to, alkanolamines such as diethanolamine, triethanolamine, and N-methyldiethanolamine; liquid ammonia; hydroxides of alkali metals such as lithium hydroxide, sodium hydroxide, and potassium hydroxide; and carbonates of alkali metals such as lithium carbonate, sodium carbonate, sodium hydrogen carbonate, and potassium carbonate.

Regarding the molecular weight of the pigment-dispersing resin, its weight average molecular weight is preferably within a range from 1000 to 100000, and more preferably in a range from 5000 to 50000. With the molecular weight within the range described above, the pigment can be dispersed in water in a stable manner, and also, the adjustment of the viscosity etc. become easier when the resin is employed in an aqueous inkjet ink. If the weight average molecular weight is lower than 1000, the dispersing resin tends to dissolve in the solvent that is added to the ink, thus allowing desorption of the resin adsorbed on the pigment, and the dispersion stability may be significantly impaired. If the weight average molecular weight is higher than 100000, the viscosity during dispersion can become high, and the stability of ejection from the inkjet head can be impaired significantly, lowering the printing stability.

In a certain preferred embodiment, the weight ratio of the pigment to the pigment-dispersing resin is preferably from 2/1 to 100/1. The ratio within the range of from 2/1 to 100/1 is preferable because the viscosity of the pigment dispersion can be reduced, and the viscosity stability and dispersion stability of the pigment dispersion and the aqueous inkjet ink can be improved, and furthermore, a quick reduction of the dispersibility can be induced upon the mixing with the pretreatment liquid. The ratio of the pigment to the pigment-dispersing resin is more preferably from 20/9 to 50/1, even more preferably from 5/2 to 25/1, and most preferably from 20/7 to 20/1.

Water-Soluble Organic Solvent

The water-soluble organic solvent used in the aqueous inkjet ink according to an embodiment of the present invention can be any known solvent, but a glycol ether-based solvent and/or an alkylpolyol-based solvent having a boiling point of from 180° C. to 280° C. at 1 atm is preferably included. With a water-soluble organic solvent satisfying the boiling point range described above, the wettability and drying property of the aqueous inkjet ink can be controlled to a suitable range, and a good ejection stability can be obtained. In addition, when the aqueous inkjet ink is combined with the pretreatment liquid, image quality defects such as bleeding can be prevented.

The boiling point at 1 atm described above can be measured by using a thermal analyzer such as a differential scanning calorimeter (DSC).

Examples of favorably used glycol ether-based solvents having a boiling point at 1 atm of from 180° C. to 280° C. include, but are not limited to, glycol monoalkyl ethers such as diethylene glycol monomethyl ether, diethylene glycol monoethyl ether, diethylene glycol monopropyl ether, diethylene glycol monobutyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, and tripropylene glycol monobutyl ether; and glycol dialkyl ethers such as diethylene glycol diethyl ether, diethylene glycol isopropylmethyl ether, diethylene glycol butylmethyl ether, triethylene glycol dimethyl ether, triethylene glycol methylethyl ether, triethylene glycol diethyl ether, triethylene glycol butylmethyl ether, tetraethylene glycol dimethyl ether, and tetraethylene glycol methyl ethyl ether.

In particular, from the perspective of achieving both excellent moisture retention and drying property, of the glycol ether-based solvents described above, the solvent is preferably selected from diethylene glycol monoethyl ether, diethylene glycol monopropyl ether, diethylene glycol monobutyl ether, triethylene glycol monoethyl ether, triethylene glycol monopropyl ether, triethylene glycol monobutyl ether, dipropylene glycol monomethyl ether, dipropylene glycol monoethyl ether, dipropylene glycol monopropyl ether, dipropylene glycol monobutyl ether, diethylene glycol butylmethyl ether, triethylene glycol methylethyl ether, triethylene glycol diethyl ether, triethylene glycol butylmethyl ether, and tetraethylene glycol methylethyl ether.

Examples of the alkyl polyol-based solvent having a boiling point at 1 atm from 180° C. to 280° C. include, but are not limited to, 1,2-ethanediol, 1,2-propanediol (propylene glycol), 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl-2-propyl-1,3-propanediol, 2-methylpentane-2,4-diol, 2-ethyl-1,3-hexanediol, ethylene glycol, diethylene glycol, dipropylene glycol, and dibutylene glycol.

From the perspective of achieving both excellent moisture retention and drying property, among the above alkyl polyol solvents, 1,2-propanediol, 1,2-butanediol, 1,3-butanediol, 1,2-pentanediol, 1,5-pentanediol, 1,2-hexanediol, 1,6-hexanediol, or 1,2-heptanediol is especially preferably selected.

The total amount of the glycol ether-based solvent and/or the alkylpolyol-based solvent having a boiling point at 1 atm from 180° C. to 280° C. used in an aqueous inkjet ink according to an embodiment of the present invention is preferably from 5 wt % to 50 wt % relative to the total amount of aqueous inkjet ink. Furthermore, from the perspective of ensuring the stability of ejection from the aqueous inkjet nozzle, as well as sufficient wet-spreading and drying property when combined with the pretreatment liquid, the total amount of the water-soluble organic solvent is more preferably from 10 wt % to 45 wt %, and particularly preferably from 15 wt % to 40 wt %. If the total amount of the water-soluble organic solvent is less than 5 wt %, the moisture retention ability of the ink may become insufficient, and the ejection stability may be compromised. Conversely, if the total amount of the water-soluble organic solvent is greater than 50 wt %, the viscosity of the ink may become too high, which is not preferable because the high viscosity may impair the ejection stability.

Other organic solvents besides a glycol ether-based solvent and/or an alkylpolyol-based solvent having a boiling point of from 180° C. to 280° C. at 1 atm can also be used in combination in order to adjust the moisture retention and wettability of the aqueous inkjet ink. Specifically, any of the monohydric alcohol, trihydric alcohol, nitrogen-containing solvent, heterocyclic compound, and the like, which have been listed above as the water-soluble organic solvents usable in the pretreatment liquid, can be used in the aqueous inkjet ink. These solvents may be each used alone, or two or more of these solvents may be used together as a mixture.

The amount of the water-soluble organic solvent having a boiling point at 1 atm of 280° C. or higher, in the aqueous inkjet ink according to an embodiment of the present invention, is preferably from 0 to 5 wt % relative to the total weight of the aqueous inkjet ink. With the amount of the water-soluble organic solvent controlled within the range described above, a printed material having improved drying property and excellent adhesion and printed image quality with respect to non-permeable substrates can be obtained. Furthermore, from the perspective of even more favorably realizing the above effects, the amount of the water-soluble organic solvent having a boiling point of 280° C. or higher at 1 atm is more preferably from 0 to 3 wt %, and particularly preferably from 0 to 1 wt %, relative to the total amount of the aqueous inkjet ink. In the present specification, "0 wt %" means that the material in question is not included.

Also, for the same reasons as described above, the amount of the water-soluble organic solvent having a boiling point of 220° C. or higher at 1 atm comprised in the aqueous inkjet ink in an embodiment is preferably from 0 to 20 wt. %, more preferably from 0 to 10 wt. %, even more preferably from 0 to 5 wt. %, and particularly preferably from 0 to 3 wt. %, relative to the total amount of the aqueous inkjet ink. It should be noted that in calculating the amount of water-soluble organic solvent having a boiling point of 220° C. or higher at 1 atm, the glycol ether-based solvents and/or the alkylpolyol solvents having boiling points within the range of 180° C. to 280° C. at 1 atm will also be taken into account if they have a boiling point of 220° C. or higher.

From the perspective of simultaneously achieving moisture retention property, drying property, and wettability of the ink, the total amount of water-soluble organic solvent in the aqueous inkjet ink according to an embodiment of the present invention is preferably from 5 wt % to 70 wt %, more preferably from 10 wt % to 60 wt %, and particularly preferably from 15 wt % to 50 wt %, relative to the total amount of the aqueous inkjet ink.

Binder Resin

A binder resin is preferably added to the aqueous inkjet ink according to an embodiment of the present invention. Water-soluble resins and resin microparticles are commonly known for binder resins. Of these, the resin microparticles are more suitable for improving the durability of the printed material because they have higher molecular weights compared to the water-soluble resins, and also because they can reduce the viscosity of the aqueous inkjet inks and thus a larger amount of such resin can be included in the aqueous inkjet inks. Examples of the types of resins that may be used as resin microparticles include, but are not limited to, acrylic-based, styrene acrylic-based, urethane-based, styrene butadiene-based, vinyl chloride-based, and polyolefin-based resins. Of these, acrylic-based and styrene acrylic-based resin microparticles are preferable from the viewpoints of the stability of the aqueous inkjet ink and the durability of the printed material.

However, in a case where the binder resin in the aqueous inkjet ink is in the form of resin microparticles, the minimum film-formation temperature (MFT) of the resin microparticles needs to be considered. This is because if resin microparticles having a low MFT are used, the MFT of the resin microparticles may be further lowered by the water-soluble organic solvent added in the aqueous inkjet ink, and therefore the resin microparticles may undergo fusion or aggregation even at room temperature, which may lead to clogging of the inkjet head nozzle. In order to avoid the problems described above, the MFT of the resin microparticles is preferably set to 60° C. or higher by adjusting the monomers constituting the resin microparticles.

The MFT can be measured by using an MFT tester available from Tester Sangyo Co., Ltd, for example. Specifically, a 25 wt % aqueous solution of the resin microparticles is applied on a film to form a WET film thickness of 300 μm, and then placed on the tester to which a temperature gradient is applied. After drying, the temperature at the boundary between a region where white precipitates have been formed and a region where a transparent resin film has been formed is defined as the MFT.

However, in the interest of maintenance performance of the inkjet printer, the binder resin in an aqueous inkjet ink according to an embodiment of the present invention is more preferably a water-soluble resin. The weight average molecular weight of the water-soluble resin is preferably within a range from 8000 to 50000, and more preferably within a range from 10000 to 40000. With the weight average molecular weight of not lower than 10000, favorable coating film durability of the printed material can be obtained. With the weight average molecular weight of not higher than 50000, an ink having superior stability of ejection from the inkjet head can be produced.

Furthermore, the acid value is also important in selecting the water-soluble resin for the binder resin, and the acid value is preferably from 10 to 80 mg KOH/g, and more preferably from 20 to 50 mg KOH/g. An acid value of lower than 10 mg KOH/g is not preferable, because in that case the re-solubility of the solidified aqueous inkjet ink may become poor, causing clogging on the inkjet head nozzle as in the case for the resin microparticles, to significantly reduce printing stability, and also because the effect of suppressing bleeding and color unevenness may be reduced due to the difficulty in inducing thickening and aggregation of the ink by anionic-cationic interaction when the water-soluble resin is combined with the pretreatment liquid. An acid value exceeding 80 mg KOH/g is also not preferable, because in that case, even though re-dissolving of the solidified aqueous inkjet ink may become possible, the water resistance of the coating film of the printed material may be compromised significantly.

The binder resin content in the total amount of aqueous inkjet ink is in a range from 1 wt % to 20 wt %, more preferably in a range from 2 wt % to 15 wt %, and particularly preferably in a range from 3 wt % to 10 wt %, in terms of solid and relative to the total weight of the aqueous inkjet ink.

Surfactant

The aqueous inkjet ink according to an embodiment of the present invention preferably uses a surfactant for the purpose of adjusting the surface tension and improving image quality. On the other hand, if the surface tension is too low, the nozzle surface of the inkjet head may be wetted with the aqueous inkjet ink to lose the ejection stability, and therefore selection of the type and amount of the surfactant is very important. From the perspectives of ensuring optimal wettability and achieving stable ejection from the inkjet nozzle, a siloxane-based, acetylene-based, or fluorine-based surfactant is preferably used, and a siloxane-based or acetylene-based surfactant is particularly preferably used. Relative to the total amount of the aqueous inkjet ink, the amount of the surfactant added is preferably from 0.01 wt % to 5.0 wt %, and more preferably from 0.05 wt % to 3.0 wt %.

Further, the molecular weight of the surfactant is also important in terms of controlling the wettability in the process of evaporation of the aqueous inkjet ink and improving the quality of the printed material such as scratch resistance and solvent resistance. For the molecular weight of the surfactant, the weight average molecular weight is preferably within a range from 1000 to 7000, and more preferably within a range from 1500 to 5000. With the weight average molecular weight of 1000 or higher, the effect of controlling wetting with respect to the printing substrate can be enhanced, and with the weight average molecular weight of 7000 or lower, an aqueous inkjet ink with excellent storage stability can be obtained.

The surfactant used in the aqueous inkjet ink according to an embodiment of the present invention can be synthesized by any known methods, or alternatively, commercially available products can be used. If the surfactant is selected from commercially available products, the examples of siloxane-based surfactants and acetylene-based surfactants include those listed above as the surfactants usable in the pretreatment liquid, and the examples of fluorine-based surfactants include Zonyl TBS, FSP, FSA, FSN-100, FSN, FSO-100, FSO, FS-300, Capstone FS-30, and FS-31 (available from DuPont), and PF-151N and PF-154N (available from Omnova Solutions Inc.). The surfactants may be each used alone, or two or more types may be used in combination. However, when the ink is applied onto the pretreatment liquid layer, a high concentration of the polyvalent metal ions will be mixed into the ink layer, and thereby the surface tension of the ink may be changed greatly, which may possibly cause mixed color bleeding or the like. Therefore, it is preferable that two or more types of surfactants be used in combination to suppress the changes in the surface tension of the ink.

The surfactant used in the aqueous inkjet ink and the surfactant used in the pretreatment liquid may be the same or different. In a case where different surfactants are used for the aqueous inkjet ink and the pretreatment liquid, the amounts to be added are preferably determined with careful consideration of the surface tensions of both surfactants as described above.

Water

As the water comprised in the aqueous inkjet ink according to an embodiment of the present invention, ion-exchanged water (deionized water) is preferably used rather than common water containing various ions.

The amount of water that can be used in the aqueous inkjet ink according to an embodiment of the present invention is preferably in a range from 20 to 90 wt % of the total weight of the ink.

Other Components

In addition to the above components, a pH adjusting agent can be added as necessary to the aqueous inkjet ink according to an embodiment of the present invention to formulate an ink having desired physical property values, and any material having a pH adjustment capacity can be optionally selected. Examples of materials for basification include, but are not limited to, alkanolamines such as dimethylethanolamine, diethanolamine, triethanolamine, and N-methyldiethanolamine; liquid ammonia; hydroxides of alkali metals such as lithium hydroxide, sodium hydroxide, and potassium hydroxide; and carbonates of alkali metals such as lithium carbonate, sodium carbonate, sodium hydrogen carbonate, and potassium carbonate. Examples of materials that can be used for acidification include, but are not limited to, hydrochloric acid, sulfuric acid, acetic acid, citric acid, maleic acid, maleic anhydride, succinic acid, tartaric acid, malic acid, phosphoric acid, boric acid, fumaric acid, malonic acid, ascorbic acid, and glutamic acid. The above pH adjusting agents may be each used alone, or two or more types may be used in combination.

The amount of the pH adjusting agent is preferably from 0.01 to 5 wt %, more preferably from 0.1 to 3 wt %, and most preferably from 0.2 to 1.5 wt %, with respect to the total amount of the aqueous inkjet ink. The amount of the pH adjusting agent kept within the range described above is preferable because the pH changes such as those caused by dissolution of carbon dioxide from the air can be prevented, and also, the effect of aggregating the solid components by the polyvalent metal ions are not inhibited upon the contact of the pretreatment liquid and the ink, thus favorably realizing the effect of the invention.

Furthermore, besides the components described above, the additives such as antifoaming agents, preservatives, infrared absorbers, and ultraviolet absorbers can be added as appropriate to the aqueous inkjet ink according to an embodiment of the present invention to formulate an ink having desired physical property values depending on the needs. The amount of these additives is preferably from 0.01 wt % to 10 wt % relative to the total weight of the ink.

Preferably, the aqueous inkjet ink according to an embodiment of the present invention is substantially free of polymerizable monomers. Here, "substantially free" means that the polymerizable monomers are not deliberately added, and this does not preclude trace contamination or generation during the manufacture/storage of aqueous inkjet inks.

Aqueous Inkjet Ink Set

The aqueous inkjet inks according to the embodiments of the present invention may be each used as a single color, but they may also be used as a set of aqueous inkjet inks in which multiple colors are combined in accordance with the application. The combination is not particularly limited, but a full color image can be obtained by using the three colors, namely cyan, yellow, and magenta. Also, by adding a black ink, the black tone can be improved, and the visibility of characters and the like can be enhanced. Furthermore, color reproducibility can also be improved by adding such colors as orange and green. When printing on a non-white printing medium, a sharp image can be obtained by combining a white ink.

Method for Producing Aqueous Inkjet Ink

Aqueous inkjet inks according to an embodiment of the present invention comprising the components as described above may be produced by the following process, for example. However, the method for producing an aqueous inkjet ink according to an embodiment of the present invention is not limited to the following.

(1) Production of a Pigment Dispersion

First, a pigment is added to an aqueous medium obtained by mixing a pigment-dispersing resin and water, and mixed and stirred, after which a dispersion treatment is performed by using a disperser. Subsequently, centrifugal separation and filtration are performed as necessary to obtain a pigment dispersion.

It is effective to perform pre-mixing before the dispersion treatment. The pre-mixing may be performed by adding the pigment to the aqueous medium which has been obtained by mixing at least the pigment-dispersing resin and water. Such a pre-mixing operation is preferable because it can improve the wettability of the pigment surface and facilitate adsorption of the dispersant onto the pigment surface.

The disperser used in performing the pigment dispersion treatment may be any commonly used disperser, including, for example, a ball mill, roll mill, sand mill, bead mill, and a Nanomizer. Bead mills are preferably used among the above, and specific examples include commercially available mills under such trade names as Supermill, Sand Grinder, Agitator Mill, Glenmill, Dyno-Mill, Pearl Mill, and Cobol Mill.

In the pigment pre-mixing and dispersion treatment, the pigment dispersant may be dispersed in water alone, or may be dispersed in a mixed solvent of an organic solvent and water.

Examples of the method for controlling the particle size distribution of the pigment dispersion include: reducing the size of the pulverizing media of the disperser described above; changing the material of the pulverizing media; increasing the charge rate of the pulverizing media; changing the shape of the stirring member (agitator); extending the dispersion treatment time; fractionating the particles by a filter, a centrifuge, or the like after the dispersion treatment; and combinations of these techniques. In order to keep the pigment within a suitable particle size range, the diameter of the pulverizing media of the disperser is preferably from 0.1 to 3 mm. Glass, zircon, zirconia, or titania may be preferably used as the material of the pulverizing media.

(2) Preparation of Aqueous Inkjet Ink

Next, a water-soluble organic solvent, water, and, as necessary, the above-described binder resin, surfactant, and other additives are added to the pigment dispersion liquid, and stirred and mixed.

The mixture may be heated in a range from 40 to 100° C. while being stirred and mixed. However, when resin microparticles are used as the binder resin, the heating temperature is preferably lower than the MFT of the resin microparticles.

(3) Removal of Coarse Particles

Coarse particles included in the mixture are removed by filtration separation, centrifugal separation, or other such technique to obtain an aqueous inkjet ink. Any known methods can be used as appropriate for the filtration separation. The diameter of the filter openings is not particularly limited as long as the coarse particles and the dust can be removed, but the diameter of the filter openings is preferably from 0.3 to 5 μm, and more preferably from 0.5 to 3 μm. When filtration is performed, a single type of filter may be used or a combination of multiple types may be used.

Characteristics of the Aqueous Inkjet Ink

The aqueous inkjet ink according to an embodiment of the present invention preferably has a viscosity at 25° C. adjusted to a range from 3 to 20 mPa·s. With this viscosity range, stable ejection characteristics can be exhibited in a range of inkjet heads, from an ordinary head having a frequency 4 to 10 kHz to a high frequency head having a frequency 10 to 70 kHz. In particular, the aqueous inkjet ink having a viscosity from 4 to 10 mPa·s at 25° C. can support stable ejection even for an inkjet head having a 600 dpi or higher resolution on the design specification.

The viscosity can be measured by using a conventional method. Specifically, the viscosity can be measured by using 1 mL of the ink and an E-type viscometer (TVE-25L Viscometer available from Toki Sangyo Co., Ltd.).

Further, from the perspective of obtaining an aqueous inkjet ink that can be stably ejected and obtaining printed material with excellent printed image quality, the aqueous inkjet ink according to an embodiment of the present invention has a static surface tension at 25° C. of preferably from 18 to 35 mN/m, and particularly preferably from 20 to 30 mN/m. Furthermore, from the perspective of preventing bleeding in the printed material and obtaining printed material with excellent printed image quality, the static surface tension of the aqueous inkjet ink according to an embodiment of the present invention is preferably set at or below the surface tension of the pretreatment liquid, by adjusting the types and amounts of the water-soluble organic solvent and the surfactant. The static surface tension in the present embodiment can be measured in the same manner as for the surface tension of the pretreatment liquid.

Also, for the same reasons as described above, the aqueous inkjet ink according to an embodiment of the present invention preferably has a dynamic surface tension of from 25 to 40 mN/m, and particularly preferably from 30 to 36 mN/m, at 25° C. and 10 milliseconds. The dynamic surface tension in the present embodiment can be measured by the maximum bubble pressure method in a 25° C. environment by using the bubble pressure dynamic surface tensiometer BP100 available from Kruss Gmbh.

In the aqueous inkjet ink according to an embodiment of the present invention, the average secondary particle size (D50) of the pigment is preferably from 40 nm to 500 nm, more preferably from 50 nm to 400 nm, and particularly preferably from 60 nm to 300 nm in order to obtain a printed material having excellent color development. In order to keep the average secondary particle size within the suitable range described above, the pigment dispersion treatment step may be controlled as described above.

Method for Producing Printed Material

For the method of producing a printed material, with the embodiment of an ink set in which the pretreatment liquid according to an embodiment of the present invention and the aqueous inkjet ink described above are combined, a preferable method is to apply the pretreatment liquid on a substrate being conveyed at a speed of 30 m/min or higher, and then to apply the aqueous inkjet ink by a one-pass printing method to the portion of the substrate at which the pretreatment liquid has been applied.

The "one-pass printing method" is a printing method in which an inkjet head scans a stationary substrate only once, or in which a substrate is passed only once under a fixed inkjet head, wherein the ink is not printed again onto the printed ink. In a one-pass printing method, the number of scans is fewer and the printing speed can be increased as compared to the conventional inkjet printing method (multi-pass printing method) in which an inkjet head scans multiple times, and therefore the one-pass printing method is suitable for industrial applications that require printing speed. In particular, the one-pass printing method is preferable for realizing the inkjet printing as an alternative to offset printing and gravure printing, as actively considered in recent years.

However, various problems have to be solved in order to use inkjet printing as an alternative to offset printing and gravure printing. With respect to printing speeds, the ability to support high speed printing of 30 m/min or faster, at least, is required in order to replace the conventional printing methods. It goes without saying that image defects such as bleeding and color unevenness should be absent in the printed material, but further, the ability to obtain a high-quality image at a high recording resolution of 600 dpi or higher is said to be essential. "Recording resolution" is expressed in the units of dots per inch (dpi) and represents the number of aqueous inkjet ink droplets applied per inch. The "recording resolution" in the present specification refers to both the recording resolution in the conveyance direction of the substrate and the recording resolution in the direction perpendicular to the conveyance direction within the substrate plane (hereinafter referred to as the recording width direction).

A method for producing a printed material using an ink set according to an embodiment of the present invention will be described below.

Method for Applying Pretreatment Liquid

When a printed material is to be produced using an ink set according to an embodiment of the present invention, the pretreatment liquid is preferably applied onto a substrate that is conveyed at a speed of 30 m/min or greater, prior to the printing of the aqueous inkjet ink. The method of applying the pretreatment liquid onto the substrate may be either a method of printing in a non-contact manner against the substrate, such as inkjet printing, or a method of printing by contacting the substrate with the pretreatment liquid.

In recent years, inkjet heads have been developed that can eject even a liquid composition having a viscosity of approximately 100 mPa·s at 25° C. by, inter alia, employing an in-head heater and optimizing the in-head flow path and nozzle structure, and the pretreatment liquid according to an embodiment of the present invention can be readily applied onto a substrate by using the inkjet printing method. From the perspective of leaving the original texture of the substrate in the non-printed portions, when inkjet printing is used as the method for applying the pretreatment liquid it is preferable to apply the pretreatment liquid only to the portions at which the aqueous inkjet ink is to be applied.

On the other hand, from the perspective of avoiding a damage to the members constituting the inkjet head and ensuring inkjet printability, when a printed material is to be produced using an ink set according to an embodiment of the present invention, a printing method in which the pretreatment liquid is brought into contact with the substrate is preferably used. The printing method in which the pretreatment liquid is brought into contact with the substrate can be selected from any of the conventionally known methods as desired, but from the perspectives of device simplicity, uniform coating properties, work efficiency, economic performance etc., it is preferable to employ a roller system. The "roller system" refers to a printing system in which the pretreatment liquid is applied to rotating rollers in advance, and then the pretreatment liquid is transferred to the substrate. Examples of a roller type coater that can be particularly preferably used include an offset gravure coater, a gravure coater, a doctor coater, a bar coater, a blade coater, a flexo coater, and a roll coater.

Method of Drying After Pretreatment Liquid Application

With an ink set according to an embodiment of the present invention, after the pretreatment liquid is applied to the film substrate and before the aqueous inkjet ink is applied, it is preferable to dry the film substrate, and hence to dry the pretreatment liquid on the substrate. In particular, it is preferable that the pretreatment liquid be completely dried before the aqueous inkjet ink is applied, that is, the liquid component of the pretreatment liquid be completely removed. When the aqueous inkjet ink is applied before the pretreatment liquid has been completely dried, the deposited dots of the aqueous inkjet ink tend to diffuse which can lead to mixed color bleeding.

The drying method used for printing the pretreatment liquid according to an embodiment of the present invention is not particularly limited, and examples include a heating and drying method, a hot air drying method, an infrared drying method, a microwave drying method, and a drum drying method. The drying methods described above may be each used alone or a plurality of the drying methods may be used in combination. For example, when a combination of a heating and drying method and a hot air drying method is used, the pretreatment liquid can be dried more rapidly than when each of these methods is used alone. Among these, use of a hot air drying method is preferable because it can minimize the damage to the film substrate and it can efficiently dry the film substrate.

Further, the drying temperature is preferably set in a range from 35 to 100° C. in the case of the heating and drying method, and the hot air temperature is preferably set in a range from 50 to 250° C. in the case of the hot air drying method, from the perspective of preventing the damage to the substrate and the bumping of the liquid component in the pretreatment liquid.

Device for Applying and Drying the Pretreatment Liquid

The device for applying and drying a pretreatment liquid according to an embodiment of the present invention may be equipped in-line or off-line with respect to an inkjet printing device described below, but it is preferably equipped in-line, from the perspective of convenience during the printing.

Method for Applying Aqueous Inkjet Ink

As described above, the aqueous inkjet ink is preferably applied to the substrate by a one-pass printing method. As described above, there are two types of one-pass printing methods: a method of allowing an inkjet head to scan a stationary substrate only once, and a method of allowing a substrate to pass under a fixed inkjet head only once. However, when allowing the inkjet head to scan, the ejection timing needs be adjusted with the consideration of the movement of the inkjet head, and the process is prone to deviations of the depositing positions. Therefore, when printing an aqueous inkjet ink according to an embodiment of the present invention, the method in which the substrate is scanned by a fixed inkjet head is preferably used. In this case, the conveyance speed of the substrate is preferably not less than 30 m/min. In particular, if the device for applying the pretreatment liquid is installed in-line with the inkjet printing device, from the device for applying the pretreatment liquid to the inkjet printing device is preferably arranged in a continuous manner such that the substrate which has received the pretreatment liquid is conveyed directly to the inkjet printing unit.

As also described above, by using an ink set according to an embodiment of the present invention, a high-quality image can be produced even at a high speed and a recording resolution of 600 dpi or greater, but the recording resolution of the printed material is particularly preferably 720 dpi or higher because a printed material having image quality equivalent to that of offset printing and gravure printing can be thereby provided.

Inkjet Head

In a case where a method of passing a substrate only once under a fixed inkjet head is employed as the one-pass printing method, the recording resolution in the recording width direction is determined by the designed resolution of the inkjet head. As described above, in the present embodiment, the recording resolution in the recording width direction is preferably not less than 600 dpi, and therefore, naturally, the designed resolution of the inkjet head is also preferably not less than 600 dpi. If the designed resolution of the inkjet head is 600 dpi or greater, the printing can be implemented with one inkjet head per color, which is preferable from the perspectives of device size reduction and economy. When an inkjet head having a designed resolution of lower than 600 dpi is used, a recording resolution in the recording width direction of 600 dpi or higher can still be realized even with one-pass printing, by using a plurality of inkjet heads per color, the heads being aligned along the conveyance direction.

The printing resolution in the conveyance direction of the substrate depends not only on the designed resolution of the inkjet head, but also on the drive frequency of the inkjet head and the printing speed. For example, the recording resolution in the conveyance direction can be doubled by reducing the printing speed by half or doubling the drive frequency. Even in a case where a printing resolution of 600 dpi or greater is not achievable in the conveyance direction at a printing speed of 30 m/min or greater due to the design of the inkjet head, a plurality of such inkjet heads per color can be used, the heads being aligned along the conveyance direction of the substrate, to simultaneously achieve the printing speed and the printing resolution.

When printing an aqueous inkjet ink according to an embodiment of the present invention by using an inkjet one-pass printing method, the drop volume of the aqueous inkjet ink will largely depend on the performance of the inkjet head, but it is preferably in the range of from 1 to 30 pL in order to achieve a high quality image. Furthermore, in order to obtain a high-quality image, it is particularly preferable to use an inkjet head having a gradation function which can vary the drop volumes.

Method of Drying After Aqueous Inkjet Ink Printing

After the aqueous inkjet ink has been printed on the film substrate to which the pretreatment liquid had been previously applied, the substrate is preferably dried, to dry the aqueous inkjet ink and the undried pretreatment liquid.

Device for Drying Aqueous Inkjet Inks

The device for drying aqueous inkjet inks may be equipped in-line or off-line with respect to the inkjet printing device, but it is preferably equipped in-line from the perspective of, inter alia, convenience during the printing. Furthermore, to prevent bleeding, color unevenness, and curling of the substrate, etc., the heat energy from the dryer is preferably applied within 30 seconds of the printing, more preferably within 20 seconds, and particularly preferably within 10 seconds.

Amounts of Application of Pretreatment Liquid and Aqueous Inkjet Ink

When printing an ink set according to an embodiment of the present invention, the amount of the pretreatment liquid according to an embodiment of the present invention applied to the substrate is preferably from 1 to 25 g/m$^2$. With the applied amount of the pretreatment liquid controlled within the range described above, it is possible to: suppress color bleeding and cracking; achieve improved drying property of the ink flocculant layer after the application; prevent such issues as adhesion to the inside of the coating device and offsetting which might occur when the substrates are stacked after the printing; and obtain a printed material that is free of tackiness (stickiness).

Further, when printing an ink set according to an embodiment of the present invention, the ratio of the amount of the aqueous inkjet ink applied, to the amount of the pretreatment liquid applied, is preferably from 0.1 to 10. This ratio is more preferably from 0.5 to 9, and particularly preferably from 1 to 8. With the ratio controlled within the range described above, a high-quality printed material can be obtained without a change in the texture of the substrate caused by an excessive amount of pretreatment liquid, and without bleeding or color unevenness caused by an excessive amount of aqueous inkjet ink and insufficient effectiveness of the pretreatment liquid.

Printing Speed

As described above, when a printed material is produced by using an ink set according to an embodiment of the present invention, the printing speed is preferably at least 30 m/min, more preferably at least 50 m/min, even more preferably at least 75 m/min, and particularly preferably at least 100 m/min.

Film Substrate

When printing by using an ink set according to an embodiment of the present invention, any known film substrate can be used. For example, a polyvinyl chloride sheet, a PET film, a polypropylene film, a polyethylene film, a nylon film or other various plastic substrates can be used. The substrate may provide a smooth or irregular surface on the printing medium, and may be transparent, semi-transparent, or opaque. Furthermore, the substrate may comprise two or more types of these printing media adhered to each other. Furthermore, a peelable adhesive layer or the like may be provided on the side opposite of the printed surface, or an adhesive layer or the like may be provided on the printed surface following the printing. The substrate used for printing the ink set according to an embodiment of the present invention may be in the form of a roll or a sheet.

In particular, the substrate is especially preferably a PET film, a polypropylene film, a polyethylene film, or a nylon film for satisfactory effectuation of the pretreatment liquid functions.

Coating Treatment

With the printed material produced by using the ink set according to an embodiment of the present invention, the printing surface can be subjected to a coating treatment as needed. Specific examples of the coating treatment include: applying/printing of a coating composition; and lamination by a dry lamination method, a solvent-free lamination method, an extrusion lamination method, a hot melt lamination, or the like. Either one of these may be selected or both of them may be combined.

Examples

The pretreatment liquid and the ink set including the pretreatment liquid, which are embodiments of the present invention, are described in further detail below through examples and comparative examples. In the following description, "parts" and "%" refer to "parts by weight" and "wt %", respectively, unless otherwise specified.

Production Example of Pretreatment Liquid 1

The materials described below were mixed for 1 hour under stirring, and then filtered by using a membrane filter having a pore size of 1 µm. Thus, a pretreatment liquid 1 was obtained.

Superchlon E-480T (30% solid content): 0.33 parts
  [Nonionic chlorinated polyolefin resin available from Nippon Paper Chemicals Co., Ltd., softening temperature: 70° C., D50: 70 to 80 nm]
Aluminum sulfate (14-18)hydrate ($Al_2(SO_4)_3 \cdot (14\text{-}18) H_2O$): 10 parts
Isopropyl alcohol (IPA): 5 parts
Surfynol 465 (acetylene-based surfactant, available from Air Products and Chemicals, Inc.): 1 part
Ion-exchanged water: 83.67 parts.

Production Examples of Pretreatment Liquids 2 to 65

Pretreatment liquids 2 to 65 were obtained by the same method as for the pretreatment liquid 1 but using the materials listed in Table 1 below.

TABLE 1

| | | | Pretreatment Liquid No. | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Polyolefin resin particles (A) | | Superchlon E-480 T (solid content = 30%) [Softening temperature: 70° C., D50: 70-80 nm] | 0.33 | 3.33 | 33.33 | 66.67 | 3.33 | 3.33 | | | | | | |
| | | Superchlon E-415 (solid content = 30%) [Softening temperature: 85° C., D50: 70-80 nm] | | | | | | | 3.33 | | | | | |
| | | AQUACER498 (solid content = 50%) [Softening temperature: 60° C., D50: 300 nm] | | | | | | | | 2.00 | | | | |
| | | Auroren AE-301 (solid content = 30%) [Softening temperature: 70° C., D50: 70-80 nm] | | | | | | | | | 3.33 | | | |
| | | Auroren AE-502 (solid content = 30%) [Softening temperature: 80° C., D50: 130 nm] | | | | | | | | | | 3.33 | | |
| | | Hordamer PE03 (solid content = 40%) [Softening temperature: 95° C., D50: 170 nm] | | | | | | | | | | | 2.50 | |
| | | Hardlen NZ-1004 (solid content = 30%) [Softening temperature: 70° C., D50: 120 nm] | | | | | | | | | | | | 3.33 |
| Flocculant (B) | Metal salt | $Al_2(SO_4)_3 \cdot (14\text{-}18)H_2O$ [Solubility = 36.4 g/100 ml] | 10 | 10 | 10 | 10 | 5 | 20 | 10 | 10 | 10 | 10 | 10 | 10 |
| Surfactant | | Surfynol 465 | 1 | 1 | 1 | 1 | 1 | 1 | 1 | 1 | 1 | 1 | 1 | 1 |
| Protic organic solvent | Water-soluble organic solvent | IPA (boiling point 82.6° C.) | 5 | 5 | 5 | 5 | 5 | 5 | 5 | 5 | 5 | 5 | 5 | 5 |
| | | Water | 83.67 | 80.67 | 50.67 | 17.33 | 85.67 | 70.67 | 80.67 | 82.00 | 80.67 | 80.67 | 81.50 | 80.67 |
| Weighted average of boiling points of protic solvents and water (° C.) | | | 99 | 99 | 99 | 99 | 99 | 99 | 99 | 99 | 99 | 99 | 99 | 99 |
| Weighted average of boiling points of protic solvents (° C.) | | | 83 | 83 | 83 | 83 | 83 | 83 | 83 | 83 | 83 | 83 | 83 | 83 |
| Surface tension of pretreatment liquid (mN/m) | | | A | A | A | A | A | A | A | A | A | A | A | A |

| | | | Pretreatment Liquid No. | | | | | | | | | | | | |
|---|---|---|---|---|---|---|---|---|---|---|---|---|---|---|
| | | | 13 | 14 | 15 | 16 | 17 | 18 | 19 | 20 | 21 | 22 | 23 | 24 | 25 |
| Polyolefin resin particles (A) | | Superchlon E-480 T (solid content = 30%) [Softening temperature: 70° C., D50: 70-80 nm] | 3.33 | 3.33 | 3.33 | 3.33 | 3.33 | 3.33 | 3.33 | 3.33 | 3.33 | 3.33 | 3.33 | 3.33 | 3.33 |
| Flocculant (B) | Metal salt | NaCl [Solubility = 35.9 g/100 ml] | 10 | | | | | | | | | | | | |
| | | $Na_2SO_4$ [Solubility = 19.5 g/100 ml] | | 10 | | | | | | | | | | | |

TABLE 1-continued

|  |  |  | | | | | | | | | | | | | |
|---|---|---|---|---|---|---|---|---|---|---|---|---|---|---|---|
|  |  | NaCOOCH₃ [Solubility = 35.9 g/100 ml] |  |  | 10 |  |  |  |  |  |  |  |  |  |  |
|  |  | NaCO₃ [Solubility = 21.5 g/100 ml] |  |  |  | 10 |  |  |  |  |  |  |  |  |  |
|  |  | KCl [Solubility = 34.2 g/100 ml] |  |  |  |  | 10 |  |  |  |  |  |  |  |  |
|  |  | KNO₃ [Solubility = 31.6 g/100 ml] |  |  |  |  |  | 10 |  |  |  |  |  |  |  |
|  |  | K₂SO₄ [Solubility = 11.1 g/100 ml] |  |  |  |  |  |  | 10 |  |  |  |  |  |  |
|  |  | MgCl₂ [Solubility = 54.6 g/100 ml] |  |  |  |  |  |  |  | 10 |  |  |  |  |  |
|  |  | MgSO₄ [Solubility = 33.7 g/100 ml] |  |  |  |  |  |  |  |  | 10 |  |  |  |  |
|  |  | Mg(COOCH₃)₂•3H₂O [Solubility = 53.4 g/100 ml] |  |  |  |  |  |  |  |  |  | 10 |  |  |  |
|  |  | CaCl₂ [Solubility = 74.5 g/100 ml] |  |  |  |  |  |  |  |  |  |  | 10 |  |  |
|  |  | Ca(COOCH₃)₂•H₂O [Solubility = 34.7 g/100 ml] |  |  |  |  |  |  |  |  |  |  |  | 10 |  |
|  |  | PAC [Solubility = 45.8 g/100 ml] |  |  |  |  |  |  |  |  |  |  |  |  | 10 |
| Surfactant |  | Surfynol 465 | 1 | 1 | 1 | 1 | 1 | 1 | 1 | 1 | 1 | 1 | 1 | 1 | 1 |
| Protic organic solvent | Water-soluble organic solvent | IPA (boiling point 82.6° C.) | 5 | 5 | 5 | 5 | 5 | 5 | 5 | 5 | 5 | 5 | 5 | 5 | 5 |
|  |  | Water | 80.67 | 80.67 | 80.67 | 80.67 | 80.67 | 80.67 | 80.67 | 80.67 | 80.67 | 80.67 | 80.67 | 80.67 | 80.67 |
| Weighted average of boiling points of protic solvents and water (° C.) |  |  | 99 | 99 | 99 | 99 | 99 | 99 | 99 | 99 | 99 | 99 | 99 | 99 | 99 |
| Weighted average of boiling points of protic solvents (° C.) |  |  | 83 | 83 | 83 | 83 | 83 | 83 | 83 | 83 | 83 | 83 | 83 | 83 | 83 |
| Surface tension of pretreatment liquid (mN/m) |  |  | A | A | A | A | A | A | A | A | A | A | A | A | A |

|  |  |  | Pretreatment Liquid No. | | | | | | | | | | | |
|---|---|---|---|---|---|---|---|---|---|---|---|---|---|---|
|  |  |  | 26 | 27 | 28 | 29 | 30 | 31 | 32 | 33 | 34 | 35 | 36 | 37 | 38 |
| Polyolefin resin particles (A) | Superchlon E-480 T (solid content = 30%) [Softening temperature: 70° C., D50: 70-80 nm] |  | 3.33 | 3.33 | 3.33 | 3.33 | 3.33 | 3.33 | 3.33 | 16.67 | 16.67 | 3.33 |  |  |  |
|  | Auroren AE-301 (solid content = 30%) [Softening temperature: 70° C., D50: 70-80 nm] |  |  |  |  |  |  |  |  |  |  |  | 3.33 | 3.33 | 3.33 |
| Flocculant (B) | Metal salt | Ca(COOCH₃)₂•H₂O [Solubility = 34.7 g/100 ml] |  |  |  |  |  |  |  | 10 | 10 |  | 5 | 5 | 5 |
|  | Cationic resin | PAS-H-1L (solid content = 28%) | 35.7 |  |  |  |  |  |  |  |  | 35.7 |  |  |  |
|  |  | PAS-J-81L (solid content = 25%) |  | 40 |  |  |  |  |  |  |  |  |  |  |  |
|  |  | PAA-U7030 (solid content = 20%) |  |  | 50 |  |  |  |  |  |  |  |  |  |  |
|  |  | PE-30 (solid content = 53%) |  |  |  | 10 |  |  |  |  |  |  |  |  |  |
|  |  | P-1000 (solid content = 30%) |  |  |  |  | 33.3 |  |  |  |  |  |  |  |  |
|  |  | MZ477 (solid content = 23%) |  |  |  |  |  | 43.5 |  |  |  |  |  |  |  |
|  |  | NS-625XC (solid content = 12%) |  |  |  |  |  |  | 83.3 |  |  |  |  |  |  |
| Surfactant |  | Surfynol 465 | 1 | 1 | 1 | 1 | 1 | 1 | 1 |  |  | 1 |  |  |  |
| Protic organic solvent | Water-soluble organic solvent | IPA (boiling point 82.6° C.) | 5 | 5 | 5 | 5 | 5 | 5 | 5 | 5 |  | 5 | 5 | 5 | 1 |
|  |  | Water | 54.96 | 50.67 | 40.67 | 80.67 | 57.34 | 47.19 | 7.34 | 68.33 | 73.33 | 55.96 | 85.67 | 86.67 | 90.67 |
| Weighted average of boiling points of protic solvents and water (° C.) |  |  | 99 | 99 | 98 | 99 | 99 | 98 | 94 | 99 | 100 | 99 | 99 | 99 | 100 |
| Weighted average of boiling points of protic solvents (° C.) |  |  | 83 | 83 | 83 | 83 | 83 | 83 | 83 | 83 | — | 83 | 83 | 83 | 83 |
| Surface tension of pretreatment liquid (mN/m) |  |  | A | A | A | A | A | A | A | A | B | C | A | B | C |

TABLE 1-continued

|  |  | Pretreatment Liquid No. | | | | | | | | | | | |
|---|---|---|---|---|---|---|---|---|---|---|---|---|
|  |  | 39 | 40 | 41 | 42 | 43 | 44 | 45 | 46 | 47 | 48 | 49 | 50 |
| Polyolefin resin particles (A) | Superchlon E-480 T (solid content = 30%) [Softening temperature: 70° C., D50: 70-80 nm] | 16.67 | 16.67 | 16.67 | 16.67 | 16.67 | 16.67 | 16.67 | 66.67 | 16.66 | | | |
|  | Auroren AE-301 (solid content = 30%) [Softening temperature: 70° C., D50: 70-80 nm] | | | | | | | | | 16.66 | 16.66 | 33.33 | 33.33 |
|  | Auroren AE-502 (solid content = 30%) [Softening temperature: 80° C., D50: 130 nm] | | | | | | | | | | 16.66 | | |
|  | AQUACER 513 (solid content = 35%) [Softening temperature: 125° C., D50: 110 nm] | | | | | | | | | | | 2.86 | |
| Flocculant (B) | Metal salt Ca(COOCH$_3$)$_2$•H$_2$O [Solubility = 34.7 g/100 ml] | 10 | 10 | 10 | 10 | 10 | 10 | 10 | | 10 | 10 | 10 | 5 |
|  | Al$_2$(SO$_4$)$_3$•(14-18)H$_2$O [Solubility = 36.4 g/100 ml] | | | | | | | | 10 | | | | |
| Surfactant | Surfynol 465 | 1 | 1 | 1 | 1 | 1 | 1 | 1 | 1 | 1 | 1 | 1 | 1 |
| Protic organic solvent | Water-soluble organic solvent IPA (boiling point 82.6° C.) | | | | | | | | 20 | 5 | 5 | 5 | 5 |
|  | PG (boiling point: 188° C.) | 5 | | | | 18 | 24 | 32 | | | | | |
|  | BDG (boiling point: 230° C.) | | 5 | | | | | | | | | | |
|  | DEG (boiling point: 244° C.) | | | 5 | | | | | | | | | |
|  | Glycerin (boiling point: 290° C.) | | | | 5 | | | | | | | | |
|  | Water | 67.33 | 67.33 | 67.33 | 67.33 | 54.33 | 48.33 | 40.33 | 2.33 | 50.68 | 50.68 | 47.81 | 55.67 |
| Weighted average of boiling points of protic solvents and water (° C.) | | 105 | 108 | 109 | 111 | 119 | 125 | 134 | 95 | 99 | 99 | 99 | 99 |
| Weighted average of boiling points of protic solvents (° C.) | | 188 | 230 | 244 | 290 | 188 | 188 | 188 | 83 | 83 | 83 | 83 | 83 |
| Surface tension of pretreatment liquid (mN/m) | | A | A | A | A | A | A | A | A | A | A | A | A |

|  |  | Pretreatment Liquid No. | | | | | | | | | |
|---|---|---|---|---|---|---|---|---|---|---|---|
|  |  | 51 | 52 | 53 | 54 | 55 | 56 | 57 | 58 | 59 | 60 |
| Polyolefin resin particles (A) | Superchlon E-480 T (solid content = 30%) [Softening temperature: 70° C., D50: 70-80 nm] | | | | | | | | | | |
|  | Auroren AE-301 (solid content = 30%) [Softening temperature: 70° C., D50: 70-80 nm] | 33.33 | 33.33 | 33.33 | 33.33 | 33.33 | 16.67 | 16.67 | 33.33 | 16.67 | 16.67 |
|  | Chemipearl M-200 (solid content = 40%) [Softening temperature: 105° C., D50: 6 μm] | | | | | | | | | | |
|  | AQUACER 513 (solid content = 35%) [Softening temperature: 125° C., D50: 110 nm] | | | | | | | | 2.86 | | 2.86 |
| Flocculant (B) | Metal salt Ca(COOCH$_3$)$_2$•H$_2$O [Solubility = 34.7 g/100 ml] | | | | | 5 | 5 | 5 | | | |
|  | Al$_2$(SO$_4$)$_3$•(14-18)H$_2$O [Solubility = 36.4 g/100 ml] | | | | | | | | | | |
|  | C$_6$H$_{10}$CaO$_6$•5H$_2$O [Solubility = 9.7 g/100 ml] | 5 | | | | | | | 5 | 5 | 5 |
|  | Acid Malonic acid | | | | | | | | | | |
| Surfactant | Surfynol 465 | 1 | 1 | 1 | 1 | | | | | | |
| Protic organic solvent | Water-soluble organic solvent IPA (boiling point 82.6° C.) | 5 | 5 | 5 | | 5 | 5 | 5 | 5 | 5 | 5 |
|  | PG (boiling point: 188° C.) | | 5 | 15 | | | | | | | |
|  | MB (boiling point: 158° C.) | | | | 10 | | | | | | |
|  | Water | 55.67 | 55.67 | 45.67 | 55.67 | 56.67 | 73.33 | 70.48 | 56.67 | 73.33 | 70.48 |
| Weighted average of boiling points of protic solvents and water (° C.) | | 99 | 104 | 114 | 106 | 99 | 99 | 99 | 99 | 99 | 99 |
| Weighted average of boiling points of protic solvents (° C.) | | 83 | 135 | 162 | 158 | 83 | 83 | 83 | 83 | 83 | 83 |
| Surface tension of pretreatment liquid (mN/m) | | A | A | A | A | B | B | B | B | B | B |

TABLE 1-continued

|  |  |  | Pretreatment Liquid No. | | | | |
| --- | --- | --- | --- | --- | --- | --- | --- |
|  |  |  | 61 | 62 | 63 | 64 | 65 |
| Polyolefin resin particles (A) |  | Superchlon E-480 T (solid content = 30%) [Softening temperature: 70° C., D50: 70-80 nm] | 3.33 |  |  |  | 3.33 |
|  |  | Auroren AE-301 (solid content = 30%) [Softening temperature: 70° C., D50: 70-80 nm] |  | 3.33 |  |  |  |
|  |  | Chemipearl M-200 (solid content = 40%) [Softening temperature: 105° C., D50: 6 μm] |  |  | 2.50 |  |  |
|  |  | AQUACER 513 (solid content = 35%) [Softening temperature: 125° C., D50: 110 nm] |  |  |  | 2.86 |  |
| Flocculant (B) | Metal salt | Ca(COOCH$_3$)$_2$•H$_2$O [Solubility = 34.7 g/100 ml] |  |  |  |  |  |
|  |  | Al$_2$(SO$_4$)$_3$•(14-18)H$_2$O [Solubility = 36.4 g/100 ml] | 10 |  | 10 | 10 |  |
|  |  | C$_6$H$_{10}$CaO$_6$•5H$_2$O [Solubility = 9.7 g/100 ml] |  |  |  |  |  |
|  | Acid | Malonic acid |  |  |  |  | 10 |
| Surfactant |  | Surfynol 465 | 1 | 1 | 1 | 1 | 1 |
| Protic organic solvent | Water-soluble organic solvent | IPA (boiling point 82.6° C.) | 5 | 5 | 5 | 5 | 5 |
|  |  | PG (boiling point: 188° C.) |  |  |  |  |  |
|  |  | MB (boiling point: 158° C.) |  |  |  |  |  |
|  |  | Water | 84.00 | 90.67 | 81.50 | 81.14 | 80.67 |
|  |  | Weighted average of boiling points of protic solvents and water (° C.) | 99 | 99 | 99 | 99 | 99 |
|  |  | Weighted average of boiling points of protic solvents (° C.) | 83 | 83 | 83 | 83 | 83 |
|  |  | Surface tension of pretreatment liquid (mN/m) | A | A | A | A | A |

The materials listed in Table 1 are as follows:

Polyolefin Resin Particles (A)

Superchlon E-480T (solid content=30%)
[Nonionic chlorinated polyolefin resin available from Nippon Paper Chemicals Co., Ltd., softening temperature: 70° C., D50: 70 to 80 nm]

Superchlon E-415 (solid content=30%)
[Nonionic chlorinated polyolefin resin available from Nippon Paper Chemicals Co., Ltd., softening temperature: 85° C., D50: 70 to 80 nm]

AQUACER498 (solid content=50%)
[Nonionic non-chlorinated paraffin resin available from BYK Chemie GMBH, softening temperature: 60° C., D50: 300 nm]

Auroren AE-301 (solid content=30%)
[Nonionic non-chlorinated polyolefin resin available from Nippon Paper Chemicals Co., Ltd., softening temperature: 70° C., D50: 70 to 80 nm]

Auroren AE-502 (solid content=30%)
[Nonionic non-chlorinated polyolefin resin available from Nippon Paper Chemicals Co., Ltd., softening temperature: 80° C., D50: 130 nm]

Hordamer PE03 (solid content=40%)
[Non-chlorinated polyethylene resin available from BYK Chemie GMBH, softening temperature: 95° C., D50: 170 nm]

Hardlen NZ-1004 (solid content=30%)
[Non-chlorinated polyolefin resin available from Toyobo Co., Ltd., softening temperature: 70° C., D50: 120 nm]

Chemipearl M-200 (solid content=40%)
[Non-chlorinated polyethylene resin available from Mitsui Chemicals, Inc.; softening temperature: 105° C., D50: 6 μm]

AQUACER 513 (solid content=35%)
[Non-chlorinated polyethylene wax available from BYK Chemie GMBH, softening temperature: 125° C., D50: 110 nm]

Flocculant (B)—Metal Salt
NaCl: Sodium chloride [solubility=35.9 g/100 ml]
Na$_2$SO$_4$: Sodium sulfate [solubility=19.5 g/100 ml]
NaCOOCH$_3$: Sodium acetate [solubility=35.9 g/100 ml]
NaCO$_3$: Sodium carbonate [solubility=21.5 g/100 ml]
KCl: Potassium chloride [solubility=34.2 g/100 ml]
KNO$_3$: Potassium nitrate [solubility=31.6 g/100 ml]
K$_2$SO$_4$: Potassium sulfate [solubility=11.1 g/100 ml]
MgCl$_2$: Magnesium chloride [solubility=54.6 g/100 ml]
MgSO$_4$: Magnesium sulfate [solubility=33.7 g/100 ml]
Mg(COOCH$_3$)$_2$·3H$_2$O: Magnesium acetate trihydrate [solubility=53.4 g/100 ml]
CaCl$_2$: Calcium chloride [solubility=74.5 g/100 ml]
Ca(COOCH$_3$)$_2$·H$_2$O: Calcium acetate monohydrate [solubility=34.7 g/100 ml]
PAC: Polyaluminum chloride [solubility=45.8 g/100 ml]
Al$_2$(SO$_4$)$_3$·(14-18)H$_2$O: [solubility=36.4 g/100 ml]
C$_6$H$_{10}$CaO$_6$·5H$_2$O: Calcium lactate pentahydrate [solubility=9.7 g/100 ml]

Flocculant (B)—Cationic Polymer Compound

PAS-H-1L (solid content=28%)
[Cationic resin aqueous solution (containing a diallyl ammonium structural unit) available from Nittobo Medical Co., Ltd.)

PAS-J-81L (solid content=25%)
[Cationic resin aqueous solution (containing a diallyl ammonium structural unit) available from Nittobo Medical Co., Ltd.)

PAA-U7030 (solid content=20%)
[Cationic resin aqueous solution available from Nittobo Medical Co., Ltd.]

PE-30: Catiomaster PE-30 (solid content=53%)
[Cationic resin aqueous solution (containing an epichlorohydrin structural unit) available from Yokkaichi Chemical Co., Ltd.]

P-1000: Epomin P-1000 (solid content=30%)
[Polyethyleneimine aqueous solution available from Nippon Shokubai Co., Ltd.]

MZ477 (solid content=23%)

[Cationic urethane resin aqueous solution available from Takamatsu Oil & Fat Co., Ltd.]

NS—625XC (solid content=12%)

[Cationic acrylic resin aqueous solution available from Takamatsu Oil & Fat Co., Ltd.]

Acid

Malonic acid: available from Wako Pure Chemical Industries, Ltd. Protic Organic Solvent IPA: isopropyl alcohol (boiling point: 82.6° C.)

PG: propylene glycol (boiling point: 188° C.)

MB: 3-methoxy-1-butanol (boiling point: 158° C.)

BDG: diethylene glycol monobutyl ether (boiling point: 230° C.)

DEG: diethylene glycol (boiling point: 244° C.)

Glycerin (boiling point: 290° C.)

Surfactant

Surfynol 465: Acetylene-based surfactant available from Air Products and Chemicals, Inc.

Measurement of Surface Tension of Pretreatment Liquid

In Table 1, the surface tensions of the pretreatment liquids 1 to 65 are presented based on the grading criteria shown below. Here, the surface tension is a value measured by the Wilhelmy method in an environment at 25° C. using an automatic surface tensiometer DY-300 available from Kyowa Interface Science Co., Ltd. and a platinum plate.

A: Surface tension was from 20 mN/m to 30 mN/m.

B: Surface tension was greater than 30 mN/m but not greater than 40 mN/m.

C: Surface tension was greater than 40 mN/m but not greater than 45 mN/m.

D: Surface tension was greater than 45 mN/m.

Production Example of Pigment-Dispersing Resin 1

93.4 parts of butanol was placed in a reaction vessel equipped with a gas inlet tube, a thermometer, a condenser, and a stirrer, and the vessel was purged with nitrogen gas. The inside of the reaction vessel was heated to 110° C., and a mixture comprising, as polymerizable monomers, 35 parts of styrene 35 parts of acrylic acid, and 30 parts of lauryl methacrylate, and 6 parts of V-601 (available from Wako Pure Chemical Industries, Ltd.) as a polymerization initiator, was added dropwise over 2 hours, to carry out a polymerization reaction. After the dropwise addition was completed, the mixture was further reacted for 3 hours at 110° C., and then 0.6 parts of V-601 (available from Wako Pure Chemical Industries, Ltd.) were added, and the reaction was further continued for one hour at 110° C., and a solution of the dispersing resin 1 was thus obtained. Furthermore, after the solution was cooled down to room temperature, 37.1 parts of dimethylaminoethanol were added to neutralize the solution, and 100 parts of water were added to create an aqueous solution. Next, the solution was heated to 100° C. or higher, and butanol was distilled off by azeotropic distillation with water, and the solid content was adjusted to 50%. An aqueous solution having a 50% solid content of the pigment-dispersing resin 1 was thereby obtained. The weight average molecular weight of the pigment-dispersing resin 1 was measured by using an HLC-8120GPC available from Tosoh Corporation, and found to be 28000. The acid value of the pigment-dispersing resin 1 was 272 mg KOH/g.

Production Examples of Pigment-Dispersing Resins 2 to 8

Aqueous solutions having 50% solid content of the pigment-dispersing resins 2 to 8 were obtained by the same operations as for the pigment-dispersing resin 1 with the exception that the monomers shown in Table 2 were used as the polymerizable monomers.

TABLE 2

| | Monomer composition | | | Weight average molecular | Acid |
| --- | --- | --- | --- | --- | --- |
| | St | AA | LMA | weight | value |
| Pigment-dispersing resin 1 | 35 | 35 | 30 | 28000 | 272 |
| Pigment-dispersing resin 2 | 45 | 25 | 30 | 25000 | 194 |
| Pigment-dispersing resin 3 | 55 | 15 | 30 | 33000 | 116 |
| Pigment-dispersing resin 4 | 60 | 10 | 30 | 32000 | 77 |
| Pigment-dispersing resin 5 | 65 | 5 | 30 | 30000 | 38 |
| Pigment-dispersing resin 6 | 68.5 | 1.5 | 30 | 35000 | 11 |
| Pigment-dispersing resin 7 | 20 | 50 | 30 | 30000 | 389 |
| Pigment-dispersing resin 8 | 27 | 43 | 30 | 25000 | 350 |

The abbreviations shown in Table 2 are as follows:

St: styrene

AA: acrylic acid

LMA: lauryl methacrylate.

Production Examples of Pigment Dispersion liquids 1C, 1M, 1Y, and 1K 20 parts of LIONOL BLUE 7358G (C. I. Pigment Blue 15:3) available from Toyo Color Co., Ltd., 20 parts of an aqueous solution of the pigment-dispersing resin 1 (50% solid content), and 60 parts of water were mixed, and pre-dispersed with a disper. Thereafter, main dispersion was conducted for 2 hours by using a Dyno-Mill having a 0.6 L capacity and charged with 1800 g of zirconia beads having a diameter of 0.5 mm, and a pigment dispersion liquid 1C was thus obtained. Further, pigment dispersion liquids 1M, 1Y, and 1K were obtained in the same manner as for the pigment dispersion liquid 1C with the exception that the C. I. Pigment Blue 15:3 was replaced with the respective pigments shown below.

Magenta: Inkjet Magenta E5B02 available from Clariant AG (C. I. Pigment Violet 19)

Yellow: LIONOL YELLOW TT-1405G available from Toyo Color Co., Ltd.

(C. I. Pigment Yellow 14)

Black: PrinteX 85 available from Orion Engineered Carbons S. A.

(Carbon black).

Production Examples of Pigment Dispersion liquids 2 to 8 (C, M, Y, and K)

Pigment dispersion liquids 2 to 8 (C, M, Y, and K for each) were obtained by using the same method as for the pigment dispersion liquids 1C, 1M, 1Y, and 1K with the exception that the aqueous solutions of the pigment-dispersing resins 2 to 8 (50% solid content) were used respectively as the pigment-dispersing resin. The formulations of the pigment dispersion liquids are shown in Table 3.

TABLE 3

| | Pigment | Pigment-dispersing resin (solid content: 50%) | | Water |
| --- | --- | --- | --- | --- |
| | | Type | Amount | |
| Pigment dispersion liquid 1 (Y, M, C, K) | 20 | Resin 1 | 20 | 80 |
| Pigment dispersion liquid 2 (Y, M, C, K) | 20 | Resin 2 | 20 | 80 |
| Pigment dispersion liquid 3 (Y, M, C, K) | 20 | Resin 3 | 20 | 80 |
| Pigment dispersion liquid 4 (Y, M, C, K) | 20 | Resin 4 | 20 | 80 |
| Pigment dispersion liquid 5 (Y, M, C, K) | 20 | Resin 5 | 20 | 80 |

TABLE 3-continued

| | Pigment | Pigment-dispersing resin (solid content: 50%) Type | Amount | Water |
|---|---|---|---|---|
| Pigment dispersion liquid 6 (Y, M, C, K) | 20 | Resin 6 | 20 | 80 |
| Pigment dispersion liquid 7 (Y, M, C, K) | 20 | Resin 7 | 20 | 80 |
| Pigment dispersion liquid 8 (Y, M, C, K) | 20 | Resin 8 | 20 | 80 |

Production Example of Binder Resin 1 (Water-Soluble Resin)

93.4 parts of butanol was placed in a reaction vessel equipped with a gas inlet tube, a thermometer, a condenser, and a stirrer, and the vessel was purged with nitrogen gas. The inside of the reaction vessel was heated to 110° C., and a mixture comprising, as polymerizable monomers, 25 parts of styrene, 5 parts of methacrylic acid, and 70 parts of methyl methacrylate, and 6 parts of V-601 (available from Wako Pure Chemical Industries, Ltd.) as a polymerization initiator, was added dropwise over 2 hours, to carry out a polymerization reaction. After the dropwise addition was completed, the mixture was further reacted for 3 hours at 110° C., and then 0.6 parts of V-601 (available from Wako Pure Chemical Industries, Ltd.) were added, and the reaction was further continued for one hour at 110° C., and a solution of the dispersing resin 1 was thus obtained. Further, after the solution was cooled down to room temperature, 37.1 parts of dimethylaminoethanol were added to neutralize the solution, and 100 parts of water were added to create an aqueous solution. Next, the solution was heated to 100° C. or higher, and butanol was distilled off by azeotropic distillation with water, and the solid content was adjusted to 50%. An aqueous solution having a 50% solid content of the binder resin 1 was thereby obtained. The weight average molecular weight of the binder resin 1 was measured by using an HLC-8120GPC available from Tosoh Corporation, and found to be 18000. The acid value of the binder resin 1 was 32 mg KOH/g.

Production Example of Binder Resin 2 (Resin Microparticles)

A reaction vessel equipped with a stirrer, a thermometer, a dropping funnel, and a reflux apparatus was charged with 40 parts of ion-exchanged water and 0.2 parts of Aqualon KH-10 (available from DKS Co., Ltd.) as a surfactant. Separately, 10 parts of 2-ethylhexyl acrylate, 57 parts of methyl methacrylate, 30 parts of styrene, 2 parts of dimethylacrylamide, 1 part of methacrylic acid, 53 parts of ion-exchanged water, and 1.8 parts of Aqualon KH-10 (available from DKS Co., Ltd.) were mixed in advance to prepare a pre-emulsion. 1% of this pre-emulsion was further added to the vessel. The internal temperature of the vessel was raised to 60° C. and the vessel was sufficiently purged with nitrogen, and 10 parts of a 5% aqueous solution of potassium persulfate and 10% of 20 parts of a 1% aqueous solution of anhydrous sodium bisulfite were added to initiate polymerization. The internal temperature of the reaction system was maintained at 60° C. for 5 minutes, after which the remainder of the pre-emulsion, and the remainder of the 5% aqueous solution of potassium persulfate and the 1% aqueous solution of anhydrous sodium bisulfite were added dropwise over 1.5 hours while maintaining the internal temperature at 60° C., and then stirring was continued for another 2 hours. After the solid content was measured to confirm the conversion ratio of greater than 98%, the temperature was cooled to 30° C. Diethylaminoethanol was added to adjust the pH to 8.5, the nonvolatile content was further adjusted to 50% with ion-exchanged water, and a resin microparticle aqueous dispersion was thus obtained. The obtained resin microparticle aqueous dispersion was used as the binder resin 2. The calculated glass transition temperature of the binder resin 2 was 80° C. The MFT of the binder resin 2 was measured by the above-described method, and found to be 90° C.

Production Example of Inkjet Ink Set 1 (CMYK)

The materials listed below were sequentially fed into a mixing vessel under stirring with a disper, and stirred until the mixture was sufficiently homogeneous. Next, the mixture was filtered by using a membrane filter having a pore size of 1 µm. In addition, the pigment dispersion liquids 1M, 1Y, and 1K were each used in place of the pigment dispersion liquid 1C, to obtain the inkjet ink set 1 consisting of the four colors of C, M, Y, and K:

Pigment dispersion liquid 1C: 25 part
Binder resin 1 (50% solid content): 10 parts
1,2-butanediol: 20 parts
TEGO WET 280: 1 part
Proxel GXL: 0.05 parts
Ion-exchanged water: 43.95 parts.

Production Examples of Inkjet Ink Sets 2 to 22

Inkjet ink sets 2 to 21 each consisting of the four colors of C, M, Y, and K were obtained by the same method as for the inkjet ink set 1 with the exception that the materials listed in Table 4 below were used.

TABLE 4

| | | CMYK Inkjet ink set | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Pigment Dispersion | Pigment dispersion liquid 1 (Y, M, C, K) | 25 | | | | | | | | | | | | | | | | | | | | | |
| | Pigment dispersion liquid 2 (Y, M, C, K) | | 25 | | | | | | | | | | | | | | | | | | | | |
| | Pigment dispersion liquid 3 (Y, M, C, K) | | | 25 | | | | | | | | | | | | | | | | | | | |
| | Pigment dispersion liquid 4 (Y, M, C, K) | | | | 25 | | | | | | | | | | | | | | | | | | |
| | Pigment dispersion liquid 5 (Y, M, C, K) | | | | | 25 | | | | | | | | | | | | | | | | | |
| | Pigment dispersion liquid 6 (Y, M, C, K) | | | | | | 25 | | | | | | | | | | | | | | | | |
| | Pigment dispersion liquid 7 (Y, M, C, K) | | | | | | | 25 | | | | | | | | | | | | | | | |
| | Pigment dispersion liquid 8 (Y, M, C, K) | | | | | | | | 25 | | | | | | | | | | | | | | |
| | | | | | | | | | | 25 | 25 | 25 | 25 | 25 | 25 | 25 | 25 | 25 | 25 | 25 | 25 | | |
| Pigment self dispersion | Cabojet | | | | | | | | | | | | | | | | | | | | | | C, M, Y: 50 K: 25 |
| Binder resin | Binder resin 1 | 10 | 10 | 10 | 10 | 10 | 10 | 10 | 10 | 10 | 10 | 10 | 10 | 10 | 10 | 10 | 10 | | | 10 | 10 | 10 | 10 |
| | Binder resin 2 | | | | | | | | | | | | | | | | 15 | 10 | | | | | |
| Water-soluble organic solvent | 1,2-BuD (boiling point: 192° C.) | 20 | 20 | 20 | 20 | 20 | 20 | 20 | 20 | 15 | 15 | 17 | 15 | 17 | 19 | 20 | | 20 | 20 | | | | 8 |
| | 1,2-HexD (boiling point: 223° C.) | | | | | | | | | 5 | | | | | | | | 5 | 5 | | 8 | | 20 |
| | PG (boiling point: 188° C.) | | | | | | | | | | | | | | | | | | | 10 | 10 | 5 | |
| | iPDG (boiling point: 207° C.) | | | | | | | | | | | | 5 | 3 | | | 5 | | | 10 | 5 | 10 | |
| | DEG (boiling point: 244° C.) | | | | | | | | | | 5 | 3 | | | 1 | | | 1 | 1 | 1 | 1 | | |
| | Glycerin (boiling point: 290° C.) | | | | | | | | | | | | | | | | | 1 | | | | | |
| Surfactant | Surfynol 465 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | TegoWet280 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 | 0.05 |
| Preservative | Proxel GXL | 43.95 | 43.95 | 43.95 | 43.95 | 43.95 | 43.95 | 43.95 | 43.95 | 43.95 | 43.95 | 43.95 | 43.95 | 43.95 | 43.95 | 44.95 | 44.95 | 37.95 | 38.95 | 38.95 | 40.95 | 40.95 | C, M, Y: 10.95 K: 35.95 |
| | Water | 0 | 0 | 0 | 0 | 0 | 0 | 0 | 0 | 0 | 0 | 0 | 5 | 3 | 1 | 0 | 5 | 0 | 0 | 5 | 5 | 0 | 0 |
| Amount of water-soluble organic solvent with boiling point at 1 atm of 280° C. or higher | | 0 | 0 | 0 | 0 | 0 | 0 | 0 | 0 | 0 | 5 | 3 | 5 | 3 | 1 | 0 | 5 | 0 | 0 | 15 | 13 | 18 | 8 |
| Amount of water-soluble organic solvent with boiling point at 1 atm of 220° C. or higher | | A | A | A | A | A | A | A | A | A | A | A | A | A | A | B | B | A | A | B | A | A | A |
| Surface tension | Static surface tension | A | A | A | A | A | A | A | A | A | A | A | A | B | A | C | C | A | B | B | A | A | A |
| Dynamic surface tension (Surface lifetime: 10 msec) of inkjet ink set (mN/m) | | | | | | | | | | | | | | | | | | | | | | | |

However, in Table 4, the amounts of Cabojet comprised in the inkjet ink set 22 were 50 wt. % for C, M, and Y and 25 wt. % for K.

Of the materials shown in Table 4, those that were not listed in Tables 1 to 3 are as follows:

CaboJet:

Cyan: Cabojet 250C (self-dispersible cyan pigment aqueous solution available from Cabot Corporation, 10% solid content);

Magenta: Cabojet 265M (self-dispersible magenta pigment aqueous solution available from Cabot Corporation, 10% solid content);

Yellow: Cabojet 270 (self-dispersible yellow pigment aqueous solution available from Cabot Corporation, 10% solid content);

Black: Cabojet 200 (self-dispersible carbon black aqueous solution available from Cabot Corporation, 20% solid content)

1,2-BuD: 1,2-butanediol (boiling point: 192° C.)

1,2-HexD: 1,2-hexanediol (boiling point: 223° C.)

iPDG: diethylene glycol monoisopropyl ether (boiling point: 207° C.)

TEGO WET280 (silicone-based (siloxane-based) surfactant available from Evonik Japan)

Proxel GXL: 1,2-benzisothiazol-3-one solution (preservative) available from Arch Chemicals, Inc.

Measurement of Surface Tension of Inkjet Ink Sets

Table 4 presents the static surface tension and dynamic surface tension of each of the inkjet ink sets 1 to 22 based on the grading criteria shown below. Here, the static surface tension is a value measured in the same manner as for the surface tension of the pretreatment liquid. In addition, the dynamic surface tension is a value at a surface age of 10 milliseconds as measured by the maximum bubble pressure method in a 25° C. environment using a bubble pressure dynamic surface tensiometer BP100 available from Kruss Gmbh.

Static Surface Tension

A: Surface tension is from 20 mN/m to 30 mN/m.

B: Surface tension is greater than 30 mN/m but not greater than 35 mN/m.

C: Surface tension is greater than 35 mN/m.

Dynamic Surface Tension

A: Surface tension is from 25 mN/m to 36 mN/m.

B: Surface tension is greater than 36 mN/m but not greater than 40 mN/m.

C: Surface tension is greater than 40 mN/m.

The following evaluations were performed for Examples 1 to 85 and Comparative Examples 1 to 5. The evaluation results are shown in Tables 5 and 6.

Production Example of Recording Medium Coated with Pretreatment Liquid

In order to apply each pretreatment liquid prepared as described above to a wet film thickness of 4 μm, a K Control Coater K202 available from Matsuo Sangyo Co., Ltd. and a wire bar No. 0 were used, and the pretreatment liquid was applied to the film substrate described below. Then, the film to which the pretreatment liquid had been applied was dried in a 70° C. air oven for 3 minutes to produce a recording medium having the pretreatment liquid applied thereon.

Substrates Used in Evaluations

OPP: Biaxially stretched polypropylene film "OPU-1" (thickness 20 μm) available from Mitsui Chemicals Tohcello, Inc.

PET: Polyethylene terephthalate film "Lumirror T60" (thickness 25 μm) available from Toray Industries, Inc.

NY: Nylon film "Harden Film N1100" (thickness 15 μm) available from Toyobo Co., Ltd.

Evaluation 1: Evaluation of Coating Suitability of Pretreatment Liquid

Based on the above production example, a recording medium coated with the pretreatment liquid was produced, and whether the pretreatment liquid had been applied uniformly to the film substrate was visually inspected. Evaluation results of "Good" or "Acceptable" indicate that the coating is suitable for practical application.

Good: The pretreatment liquid has been applied uniformly on the film substrate without any coating unevenness.

Acceptable: Coating unevenness is slightly observed but the pretreatment liquid has been applied on the film substrate.

Poor: Coating unevenness is clearly observed and the pretreatment liquid has not been uniformly applied on the film substrate.

Production Example of Printed Material

An inkjet head KJ4B-QA (available from Kyocera Corporation) was installed above a conveyor that is capable of conveying the recording medium, and the head was filled with an inkjet ink. It is noted that when the inkjet head has a designed resolution of 600 dpi and a maximum drive frequency of 30 kHz, and when printing is performed at the maximum drive frequency and a printing speed of 75 m/min, the recording resolution in the recording medium conveyance direction will be 600 dpi. Next, the recording medium having the pretreatment liquid applied thereon was fixed onto the conveyor, then the conveyor was moved at a constant speed, and the inkjet ink was ejected at a drop volume of 12 pL in the order of C, M, Y, and K as the recording medium was passed through the part where the inkjet head had been installed, to carry out the printing. The printed material was placed in a 70° C. air oven within 10 seconds of the printing and dried for 3 minutes to thereby produce a printed material.

Evaluation 2: Evaluation of Adhesion

Based on the production example described above, a recording medium coated with a pretreatment liquid was prepared. Furthermore, solid printing with a coverage rate of 100% was performed with each color, based on the above-described example of producing a printed material. The printed material was placed in a 70° C. air oven within 10 seconds of the printing and dried for 3 minutes to thereby produce a solid printed material. A cellophane tape (having a width of 18 mm or 24 mm), available from Nichiban Co., Ltd., was firmly affixed using a finger to the surface of the printed material prepared. After the firm adhesion was confirmed, the cellophane tape was held at the tip end by hand, and the tape was quickly pulled and peeled off while maintaining the angle of 45 degrees. The surfaces of the printed material and the cellophane tape after the peeling off were visually inspected to evaluate the adhesion. Evaluation results of "Excellent", "Good" or "Acceptable" indicate that the coating is suitable for practical application.

Excellent: The area of ink removal, relative to the area of cellophane tape adhesion, was from 0 to 5%.

Good: The area of ink removal, relative to the area of cellophane tape adhesion, was from 5 to 10%.

Acceptable: The area of ink removal, relative to the area of cellophane tape adhesion, was from 10 to 15%.

Poor: The area of ink removal, relative to the area of cellophane tape adhesion, was greater than 15%.

Evaluation 3: Evaluation of Mixed Color Bleeding

Printing was performed under the same conditions as in Evaluation 2 above, and a 4C (CMYK) printed material was prepared, with the gradation in which the coverage rate was varied from 40 to 320%, on a film substrate coated with the pretreatment liquid. The shapes of the dots in the printed portion was observed by using an optical microscope at a magnification of 200×, to evaluate the mixed color bleeding. The evaluation results were graded as follows, and the evaluation results of "Excellent", "Good", or "Acceptable" indicate that the level of mixed color bleeding is in a range of practical application.

Excellent: At any coverage rate, the dots of the 4C printed part were isolated, and no mixed color bleeding was observed.

Good: At coverage rate of from 40 to 280%, the dots of the 4C printed part were isolated, and no mixed color bleeding was observed Acceptable: At coverage rate of from 40 to 240%, dots of the 4C printed part were isolated, and no mixed color bleeding was observed Poor: Mixed color bleeding was clearly observed at the 4C printed part at coverage rate of from 40 to 200%.

Evaluation 4: Evaluation of Color Unevenness

Printing was performed under the same conditions as in Evaluation 2 above, and a 4C (CMYK) printed material was prepared, with the gradation in which the coverage rate was varied from 40 to 320%, on a film substrate coated with the pretreatment liquid. The extent of color unevenness in the 4C (CMYK) printed material was visually observed, and the color unevenness was evaluated. The evaluation results were graded as follows, and evaluation results of "Excellent", "Good", or "Acceptable" indicate that the color unevenness is in a range of practical application.

Excellent: Color unevenness of the 4C printed part was not observed at any of the coverage rate.

Good: Color unevenness of the 4C printed part was not observed at coverage rate of from 40 to 280%.

Acceptable: Color unevenness of 4C printed part was not observed at coverage rate of from 40 to 240%.

Poor: Color unevenness was clearly observed at the 4C printed part at coverage rate of from 40 to 200%.

Evaluation 5: Evaluation of Drying Property

Printing was performed under the same conditions as in Evaluation 2 above. A 4C (CMYK) printed material having a coverage rate of 320% was prepared on the film substrate coated with the pretreatment liquid, after which it was placed in a 70° C. air oven for the respective time, to thereby prepare a printed material. The drying property was evaluated by rubbing the surface of the printed material with a finger after the drying, and visually observing the state of the printed material surface. The evaluation results were graded as follows, and evaluation results of "Excellent", "Good", or "Acceptable" indicate that the dryness is in a range of practical application.

Excellent: The printed material had dried at a drying time of 1 minute so that no ink was removed from the printed surface even when rubbed with a finger.

Good: The printed material had dried at a drying time of from 1 to 2 minutes so that no ink was removed from the printed surface even when rubbed with a finger.

Acceptable: The printed material had dried at a drying time of from 2 to 3 minutes so that no ink was removed from the printed surface even when rubbed with a finger.

Poor: The printed material had failed to dry at a drying time of from 2 to 3 minutes so that the ink was removed from the printed surface when rubbed with a finger.

Evaluation 6: Evaluation of Voids

For Examples 33, 34, 39, 50, 51, and 80 to 85, in addition to the evaluations described above, the void evaluations were performed, by observing the solid printed material produced in Evaluation 2 with the eyes and with a magnifying glass of 25× magnification. The evaluation results were graded as follows, and evaluation results of "Excellent", "Good", or "Acceptable" indicate that the voids are in a range of practical application.

Excellent: No void was found when observed with the eyes or with a magnifying glass at a magnification of 25×.

Good: A few voids were found when observed with a magnifying glass at a magnification of 25×, but no void was found when observed with the eyes.

Acceptable: Voids were clearly found when observed with a magnifying glass at a magnification of 25×, but only a few voids were found when observed with the eyes.

Poor: Voids were clearly found when observed with the eyes and with a magnifying glass at a magnification of 25×.

TABLE 5

| | Pretreatment liquid | Inkjet ink set | Substrate | Evaluation 1 Coating suitability | 2 Adhesion | 3 Bleeding | 4 Color unevenness | 5 Drying Property |
|---|---|---|---|---|---|---|---|---|
| Example 1 | 1 | 1 | OPP | Good | Acceptable | Good | Excellent | Excellent |
| Example 2 | 2 | 1 | OPP | Good | Excellent | Good | Excellent | Excellent |
| Example 3 | 3 | 1 | OPP | Good | Excellent | Good | Excellent | Excellent |
| Example 4 | 4 | 1 | OPP | Good | Excellent | Acceptable | Good | Excellent |
| Example 5 | 5 | 1 | OPP | Good | Excellent | Acceptable | Acceptable | Excellent |
| Example 6 | 6 | 1 | OPP | Good | Acceptable | Good | Excellent | Excellent |
| Example 7 | 7 | 1 | OPP | Good | Good | Good | Excellent | Excellent |
| Example 8 | 8 | 1 | OPP | Good | Acceptable | Good | Excellent | Excellent |
| Example 9 | 9 | 1 | OPP | Good | Excellent | Good | Excellent | Excellent |
| Example 10 | 10 | 1 | OPP | Good | Excellent | Good | Excellent | Excellent |
| Example 11 | 11 | 1 | OPP | Good | Acceptable | Good | Excellent | Excellent |
| Example 12 | 12 | 1 | OPP | Good | Good | Good | Excellent | Excellent |
| Example 13 | 13 | 1 | OPP | Good | Excellent | Acceptable | Acceptable | Excellent |
| Example 14 | 14 | 1 | OPP | Good | Excellent | Acceptable | Acceptable | Excellent |
| Example 15 | 15 | 1 | OPP | Good | Acceptable | Acceptable | Acceptable | Good |
| Example 16 | 16 | 1 | OPP | Good | Excellent | Acceptable | Acceptable | Excellent |
| Example 17 | 17 | 1 | OPP | Good | Excellent | Acceptable | Acceptable | Excellent |
| Example 18 | 18 | 1 | OPP | Good | Excellent | Acceptable | Acceptable | Excellent |
| Example 19 | 19 | 1 | OPP | Good | Excellent | Acceptable | Acceptable | Excellent |
| Example 20 | 20 | 1 | OPP | Good | Acceptable | Good | Good | Good |
| Example 21 | 21 | 1 | OPP | Good | Excellent | Acceptable | Good | Excellent |

TABLE 5-continued

| | Pretreatment liquid | Inkjet ink set | Substrate | Evaluation 1 Coating suitability | 2 Adhesion | 3 Bleeding | 4 Color unevenness | 5 Drying Property |
|---|---|---|---|---|---|---|---|---|
| Example 22 | 22 | 1 | OPP | Good | Acceptable | Acceptable | Good | Excellent |
| Example 23 | 23 | 1 | OPP | Good | Acceptable | Acceptable | Acceptable | Acceptable |
| Example 24 | 24 | 1 | OPP | Good | Excellent | Excellent | Excellent | Excellent |
| Example 25 | 25 | 1 | OPP | Good | Acceptable | Good | Excellent | Excellent |
| Example 26 | 26 | 1 | OPP | Good | Excellent | Good | Good | Excellent |
| Example 27 | 27 | 1 | OPP | Good | Excellent | Good | Good | Excellent |
| Example 28 | 28 | 1 | OPP | Good | Excellent | Acceptable | Acceptable | Excellent |
| Example 29 | 29 | 1 | OPP | Good | Acceptable | Good | Good | Excellent |
| Example 30 | 30 | 1 | OPP | Good | Excellent | Acceptable | Acceptable | Excellent |
| Example 31 | 31 | 1 | OPP | Good | Excellent | Acceptable | Acceptable | Excellent |
| Example 32 | 32 | 1 | OPP | Good | Excellent | Acceptable | Acceptable | Excellent |
| Example 33 | 33 | 1 | OPP | Good | Excellent | Excellent | Excellent | Excellent |
| Example 34 | 34 | 1 | OPP | Acceptable | Excellent | Excellent | Good | Excellent |
| Example 35 | 35 | 1 | OPP | Acceptable | Acceptable | Acceptable | Acceptable | Excellent |
| Example 36 | 36 | 1 | OPP | Good | Excellent | Acceptable | Acceptable | Excellent |
| Example 37 | 37 | 1 | OPP | Acceptable | Good | Good | Good | Excellent |
| Example 38 | 38 | 1 | OPP | Acceptable | Acceptable | Acceptable | Acceptable | Excellent |
| Example 39 | 39 | 1 | OPP | Good | Excellent | Excellent | Excellent | Excellent |
| Example 40 | 40 | 1 | OPP | Good | Excellent | Excellent | Excellent | Good |
| Example 41 | 41 | 1 | OPP | Good | Good | Excellent | Excellent | Acceptable |
| Example 42 | 42 | 1 | OPP | Good | Acceptable | Excellent | Excellent | Acceptable |
| Example 43 | 43 | 1 | OPP | Good | Good | Good | Good | Good |
| Example 44 | 44 | 1 | OPP | Good | Acceptable | Good | Good | Acceptable |
| Example 45 | 45 | 1 | OPP | Good | Acceptable | Acceptable | Acceptable | Acceptable |
| Example 46 | 46 | 1 | OPP | Good | Excellent | Acceptable | Good | Excellent |
| Example 47 | 47 | 1 | OPP | Good | Excellent | Excellent | Excellent | Excellent |
| Example 48 | 48 | 1 | OPP | Good | Excellent | Excellent | Excellent | Excellent |
| Example 49 | 49 | 1 | OPP | Good | Excellent | Excellent | Excellent | Excellent |
| Example 50 | 50 | 1 | OPP | Good | Excellent | Excellent | Excellent | Excellent |
| Example 51 | 51 | 1 | OPP | Good | Excellent | Excellent | Excellent | Excellent |
| Example 52 | 52 | 1 | OPP | Good | Excellent | Excellent | Excellent | Excellent |
| Example 53 | 53 | 1 | OPP | Good | Good | Excellent | Excellent | Good |
| Example 54 | 54 | 1 | OPP | Good | Excellent | Excellent | Excellent | Excellent |
| Example 55 | 24 | 2 | OPP | Good | Excellent | Excellent | Excellent | Excellent |
| Example 56 | 24 | 3 | OPP | Good | Excellent | Excellent | Excellent | Excellent |
| Example 57 | 24 | 4 | OPP | Good | Excellent | Good | Excellent | Excellent |
| Example 58 | 24 | 5 | OPP | Good | Excellent | Acceptable | Good | Excellent |
| Example 59 | 24 | 6 | OPP | Good | Excellent | Acceptable | Acceptable | Excellent |
| Example 60 | 24 | 7 | OPP | Good | Good | Excellent | Excellent | Good |
| Example 61 | 24 | 8 | OPP | Good | Excellent | Excellent | Excellent | Good |
| Example 62 | 24 | 9 | OPP | Good | Excellent | Excellent | Excellent | Excellent |
| Example 63 | 24 | 10 | OPP | Good | Good | Excellent | Excellent | Good |
| Example 64 | 24 | 11 | OPP | Good | Excellent | Excellent | Excellent | Excellent |
| Example 65 | 24 | 12 | OPP | Good | Acceptable | Good | Excellent | Acceptable |
| Example 66 | 24 | 13 | OPP | Good | Good | Good | Excellent | Good |
| Example 67 | 24 | 14 | OPP | Good | Good | Excellent | Excellent | Excellent |
| Example 68 | 24 | 15 | OPP | Good | Excellent | Acceptable | Good | Excellent |
| Example 69 | 24 | 16 | OPP | Good | Acceptable | Acceptable | Acceptable | Good |
| Example 70 | 24 | 17 | OPP | Good | Excellent | Good | Excellent | Excellent |
| Example 71 | 24 | 18 | OPP | Good | Excellent | Acceptable | Good | Excellent |
| Example 72 | 24 | 19 | OPP | Good | Acceptable | Acceptable | Acceptable | Acceptable |
| Example 73 | 24 | 20 | OPP | Good | Acceptable | Acceptable | Acceptable | Acceptable |
| Example 74 | 24 | 21 | OPP | Good | Good | Good | Good | Acceptable |
| Example 75 | 24 | 22 | OPP | Good | Good | Acceptable | Acceptable | Excellent |
| Example 76 | 2 | 1 | PET | Good | Excellent | Good | Excellent | Excellent |
| Example 77 | 2 | 1 | Ny | Good | Excellent | Good | Excellent | Excellent |
| Example 78 | 26 | 1 | PET | Good | Excellent | Good | Good | Excellent |
| Example 79 | 26 | 1 | NY | Good | Excellent | Good | Good | Excellent |
| Example 80 | 55 | 1 | OPP | Good | Excellent | Excellent | Excellent | Excellent |
| Example 81 | 56 | 1 | OPP | Good | Excellent | Excellent | Excellent | Excellent |
| Example 82 | 57 | 1 | OPP | Good | Excellent | Excellent | Excellent | Excellent |
| Example 83 | 58 | 1 | OPP | Good | Excellent | Excellent | Excellent | Excellent |
| Example 84 | 59 | 1 | OPP | Good | Excellent | Excellent | Excellent | Excellent |
| Example 85 | 60 | 1 | OPP | Good | Excellent | Excellent | Excellent | Excellent |
| Comparative Example 1 | 61 | 1 | OPP | Good | Poor | Good | Excellent | Excellent |
| Comparative Example 2 | 62 | 1 | OPP | Good | Excellent | Poor | Poor | Excellent |
| Comparative Example 3 | 63 | 1 | OPP | Good | Poor | Good | Excellent | Excellent |

TABLE 5-continued

| | Pretreatment liquid | Inkjet ink set | Substrate | Evaluation 1 Coating suitability | 2 Adhesion | 3 Bleeding | 4 Color unevenness | 5 Drying Property |
|---|---|---|---|---|---|---|---|---|
| Comparative Example 4 | 64 | 1 | OPP | Good | Poor | Good | Excellent | Excellent |
| Comparative Example 5 | 65 | 1 | OPP | Good | Poor | Good | Good | Poor |

TABLE 6

| | Pretreatment liquid | Inkjet ink set | Substrate | Evaluation 6 Voids |
|---|---|---|---|---|
| Example 33 | 33 | 1 | OPP | Good |
| Example 34 | 34 | 1 | OPP | Acceptable |
| Example 39 | 39 | 1 | OPP | Good |
| Example 50 | 50 | 1 | OPP | Good |
| Example 51 | 51 | 1 | OPP | Good |
| Example 80 | 55 | 1 | OPP | Excellent |
| Example 81 | 56 | 1 | OPP | Excellent |
| Example 82 | 57 | 1 | OPP | Excellent |
| Example 83 | 58 | 1 | OPP | Excellent |
| Example 84 | 59 | 1 | OPP | Excellent |
| Example 85 | 60 | 1 | OPP | Excellent |

Comparative Example 1 was an example of a pretreatment liquid that did not contain the polyolefin resin particles (A), and the results indicated its poor adhesion to the OPP substrate. Comparative Example 2 is an example of a pretreatment liquid that does not contain the flocculant (B), and it resulted in a printed material with poor printed image quality including bleeding and color unevenness. Comparative Examples 3 and 4 included the polyolefin resin particles (A) and the flocculant (B), but in these comparative examples, the softening temperatures of the polyolefin resin particles (A) were higher than 100° C., which again resulted in poor adhesion. As also described above, it is believed that the film formation characteristics of the polyolefin resin particles (A) were poor due to the softening temperature residing outside the suitable range, and thus the flocculant (B) became insoluble before the film formation. Comparative Example 5 is an example in which an organic acid compound was used as the flocculant (B), which resulted in inferior adhesion and drying property. Although the detailed reasons are unclear, it is believed that the organic acid compound, in contrast to the metal salts and cationic polymer compounds, inhibits film formation of the polyolefin resin particles (A).

Compared to Comparative Examples described above, the pretreatment liquids 1 to 60 used in Examples 1 to 85 included polyolefin resin particles (A) having a softening temperature of from 50 to 100° C. and a flocculant (B) selected from metal salts or cationic polymer compounds, and resulted in good results in all of the evaluations for coating suitability, adhesion, bleeding, color unevenness, and drying property.

As for Examples 33, 34, 39, 50, 51, and 80 to 85, good results were obtained in the void evaluation as well. Of these examples, Examples 33, 39, 50, 51, and 80 to 85 had the void evaluation results of either "Excellent" or "Good". It is believed that the reason for this is that these examples included a protic organic solvent in the pretreatment liquid, and therefore the flocculant dissolved thoroughly and uniformly in the pretreatment liquid, and also the uniform coating property on the film substrate was improved. Further, particularly in Examples 80 to 85 which used the pretreatment liquids 55 to 60 containing a protic organic solvent and having a surface tension of from 30 to 40 mN/m, the results were extremely good with the void evaluation results graded as "Excellent".

The invention claimed is:

1. A pretreatment liquid for aqueous pigment inkjet ink printing, the pretreatment liquid comprising:
    polyolefin resin particles (A), a flocculant (B), and water; wherein
    the polyolefin resin particles (A) comprise a polyolefin resin modified by a functional group containing an oxygen atom,
    a softening temperature of the polyolefin resin particles (A) is from 50 to 100° C.; and
    the flocculant (B) contains at least one type of substance selected from the group consisting of metal salts and cationic polymer compounds, wherein the polyolefin resin particles (A) have an acid value of from 1 to 200 mg KOH/g.

2. The pretreatment liquid according to claim 1, wherein a 50% particle size (D50) of the polyolefin resin particles (A) is from 10 to 500 nm.

3. The pretreatment liquid according to claim 1, wherein the pretreatment liquid further comprises a protic organic solvent, and a weighted average of the boiling point of the protic organic solvent and the boiling point of the water is from 90 to 130° C.

4. The pretreatment liquid according to claim 1, wherein the pretreatment liquid has a surface tension of from 20 to 40 mN/m.

5. The pretreatment liquid according to claim 1, wherein the pretreatment liquid is used for a film substrate.

6. An ink set comprising:
    a pretreatment liquid according to claim 1; and
    an aqueous pigment inkjet ink containing a pigment, a pigment-dispersing resin, a water-soluble organic solvent, and water; wherein
    an acid value of the pigment-dispersing resin is from 30 to 375 mg KOH/g.

* * * * *